(12) United States Patent
Suzuki et al.

(10) Patent No.: US 10,484,576 B2
(45) Date of Patent: Nov. 19, 2019

(54) IMAGE PROCESSING APPARATUS AND METHOD TO GENERATE RECORDING DATA

(71) Applicant: CANON KABUSHIKI KAISHA, Tokyo (JP)

(72) Inventors: Fumiko Suzuki, Kawasaki (JP); Mayuko Yamagata, Inagi (JP); Hirokazu Tanaka, Inagi (JP); Tsukasa Doi, Tokyo (JP); Tomoyuki Tenkawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/054,767

(22) Filed: Aug. 3, 2018

(65) Prior Publication Data

US 2019/0052775 A1    Feb. 14, 2019

(30) Foreign Application Priority Data

Aug. 8, 2017   (JP) .................................. 2017-153588

(51) Int. Cl.
   *H04N 1/60*   (2006.01)
   *H04N 1/52*   (2006.01)

(52) U.S. Cl.
   CPC ............. *H04N 1/6075* (2013.01); *H04N 1/52* (2013.01); *H04N 1/6005* (2013.01); *H04N 1/608* (2013.01)

(58) Field of Classification Search
   None
   See application file for complete search history.

(56) References Cited

U.S. PATENT DOCUMENTS

| | | | | |
|---|---|---|---|---|
| 5,459,589 A * | 10/1995 | Ohnishi | ............. | H01R 13/4223 358/501 |
| 6,164,745 A * | 12/2000 | Nagoshi | ................. | B41J 19/142 347/15 |
| 6,394,612 B1 * | 5/2002 | Yano | ........................ | H04N 1/52 358/3.13 |
| 6,533,392 B1 * | 3/2003 | Koitabashi | ............. | B41J 2/2107 347/100 |
| 7,057,756 B2 * | 6/2006 | Ogasahara | ............. | B41J 2/2056 347/100 |
| 7,258,412 B2 * | 8/2007 | Maru | ..................... | B41J 2/2107 347/15 |

(Continued)

FOREIGN PATENT DOCUMENTS

JP   2017-35793 A   2/2017
JP   2017-38127 A   2/2017

*Primary Examiner* — Anh-Vinh T Nguyen
(74) *Attorney, Agent, or Firm* — Canon U.S.A., Inc. IP Division

(57) ABSTRACT

Recording data for recording an achromatic color image having a high lightness is generated as follows. A first color material and a second color material which has a hue complementary to that of the first color material are used to record the image. Recording data is generated such that a recording amount of the first color material and a recording amount of the second color material are larger than a recording amount of another color material, and such that a pixel where it is determined that the first color material is to be recorded and a pixel where it is determined that the second color material is to be recorded are at positions different from each other.

20 Claims, 13 Drawing Sheets

(56) References Cited

U.S. PATENT DOCUMENTS

| | | | | |
|---|---|---|---|---|
| 9,092,720 | B2* | 7/2015 | Nakagawa | B41J 2/155 |
| 9,501,249 | B2* | 11/2016 | Hori | G06K 15/16 |
| 9,636,937 | B2* | 5/2017 | Ikeda | B41J 2/2132 |
| 9,661,181 | B2* | 5/2017 | Kato | H04N 1/4053 |
| 9,876,940 | B2* | 1/2018 | Yamada | H04N 1/52 |
| 2005/0168762 | A1* | 8/2005 | Tsuchiya | H04N 1/54 |
| | | | | 358/1.9 |
| 2006/0007465 | A1* | 1/2006 | Hayashi | G06T 5/009 |
| | | | | 358/1.13 |
| 2006/0023943 | A1* | 2/2006 | Makino | H04N 1/58 |
| | | | | 382/167 |
| 2007/0171440 | A1* | 7/2007 | Yoshida | G06T 5/009 |
| | | | | 358/1.9 |
| 2010/0183223 | A1* | 7/2010 | Matsuoka | H04N 1/56 |
| | | | | 382/166 |
| 2012/0218574 | A1* | 8/2012 | Fukuda | H04N 1/6033 |
| | | | | 358/1.9 |
| 2012/0224199 | A1* | 9/2012 | Fukuda | H04N 1/6075 |
| | | | | 358/1.9 |
| 2013/0300788 | A1* | 11/2013 | Konno | B41J 2/2114 |
| | | | | 347/9 |

* cited by examiner

FIG.8A

| 2504 | 1738 | 3814 | 303 | 2331 | 3916 | 2870 | 3677 | 1470 | 2659 |
|---|---|---|---|---|---|---|---|---|---|
| 3585 | 500 | 2175 | 876 | 3120 | 688 | 441 | 2487 | 8 | 1055 |
| 43 | 1189 | 3378 | 2739 | 1597 | 1973 | 1153 | 3355 | 1786 | 3076 |
| 1958 | 3012 | 1375 | 4035 | 150 | 3705 | 2958 | 2252 | 3956 | 706 |
| 830 | 2320 | 635 | 1820 | 2520 | 967 | 1342 | 268 | 1524 | 2766 |
| 3627 | 2649 | 3444 | 412 | 3221 | 2078 | 3526 | 585 | 2465 | 3767 |
| 3974 | 180 | 1135 | 1494 | 3831 | 773 | 2693 | 3158 | 1903 | 1097 |
| 2191 | 3100 | 2007 | 2852 | 2354 | 63 | 1679 | 4089 | 396 | 3449 |
| 1318 | 1712 | 667 | 3562 | 1020 | 3046 | 1229 | 2196 | 1456 | 809 |
| 3786 | 2577 | 295 | 3944 | 1862 | 516 | 3736 | 2567 | 201 | 3321 |

~901

FIRST THRESHOLD MATRIX

FIG.8B

| 1592 | 2358 | 282 | 3793 | 1765 | 180 | 1226 | 419 | 2626 | 1437 |
|---|---|---|---|---|---|---|---|---|---|
| 511 | 3596 | 1921 | 3220 | 976 | 3408 | 3655 | 1609 | 4088 | 3041 |
| 4053 | 2907 | 718 | 1357 | 2499 | 2123 | 2943 | 741 | 2310 | 1020 |
| 2138 | 1084 | 2721 | 61 | 3946 | 391 | 1138 | 1844 | 140 | 3390 |
| 3266 | 1776 | 3461 | 2276 | 1576 | 3129 | 2754 | 3828 | 2572 | 1330 |
| 469 | 1447 | 652 | 3684 | 875 | 2018 | 570 | 3511 | 1631 | 329 |
| 122 | 3916 | 2961 | 2602 | 265 | 3323 | 1403 | 938 | 2193 | 2999 |
| 1905 | 996 | 2089 | 1244 | 1742 | 4033 | 2417 | 7 | 3700 | 647 |
| 2778 | 2384 | 3429 | 534 | 3076 | 1050 | 2867 | 1900 | 2640 | 3287 |
| 310 | 1519 | 3801 | 152 | 2234 | 3580 | 360 | 1529 | 3895 | 775 |

~902

SECOND THRESHOLD MATRIX

FIG.8C

| 3219 | 7 | 649 | 2324 | 1431 | 230 | 1143 | 3913 | 866 | 3154 |
|---|---|---|---|---|---|---|---|---|---|
| 2398 | 1744 | 1209 | 2777 | 2025 | 3729 | 1682 | 2666 | 1497 | 1945 |
| 1503 | 3918 | 3005 | 3550 | 789 | 3214 | 525 | 3048 | 346 | 3490 |
| 1066 | 492 | 2526 | 157 | 1880 | 1043 | 2238 | 2465 | 3762 | 1012 |
| 815 | 3341 | 2182 | 1322 | 4017 | 3395 | 1387 | 43 | 2061 | 1757 |
| 1973 | 3782 | 1661 | 366 | 2677 | 657 | 3821 | 2821 | 812 | 2631 |
| 1166 | 2770 | 3135 | 962 | 2389 | 1783 | 2981 | 1582 | 3575 | 3127 |
| 635 | 67 | 1466 | 3609 | 3279 | 188 | 1087 | 450 | 1240 | 2165 |
| 1736 | 3887 | 2288 | 510 | 2082 | 3941 | 1929 | 2547 | 3327 | 120 |
| 2046 | 2573 | 890 | 2895 | 1303 | 741 | 3081 | 3666 | 2336 | 1670 |

~903

THIRD THRESHOLD MATRIX

THRESHOLD IN FIRST THRESHOLD MATRIX 901

THRESHOLD IN FIRST THRESHOLD MATRIX 901

IMAGE PROCESSING APPARATUS AND METHOD TO GENERATE RECORDING DATA

BACKGROUND OF THE INVENTION

Field of the Invention

One disclosed aspect of the embodiments relates to an image processing apparatus and an image processing method.

Description of the Related Art

A technique for generating recording data by quantizing multivalued image data corresponding to a recording image, using a threshold matrix in which a threshold for determining whether an ink is to be discharged or not to be discharged is set for each pixel is known. At this time, when pieces of image data of inks of respective colors are quantized using the same threshold matrix, and if the values of the pieces of image data of the respective colors are the same, recording data is generated to determine that the inks of the respective colors are to be discharged to the same pixel. If the inks are discharged based on such recording data, the inks of the respective colors may be applied in a superimposed manner to each pixel region on a recording medium, and an image in which graininess is conspicuous may be formed.

In response to this, Japanese Patent Application Laid-Open No. 2017-38127 discusses a technique for grouping inks of respective colors and performing quantization by sequentially offsetting a threshold in a threshold matrix with respect to each group. Specifically, in Japanese Patent Application Laid-Open No. 2017-38127, inks of respective colors are grouped into two groups. Then, regarding the ink of a first color and the ink of a second color belonging to the same group, first, image data of the ink of the first color is quantized using a predetermined threshold matrix. Next, the value of the image data of the ink of the first color is subtracted from each threshold in the predetermined threshold matrix (each threshold in the predetermined threshold matrix is offset by the value of the image data of the ink of the first color), and image data of the ink of the second color is quantized using the predetermined threshold matrix after the offset. In the predetermined threshold matrix after the offset, a large threshold is set for a pixel where a threshold smaller than the value of the image data of the ink of the first color is set in the predetermined threshold matrix before the offset, i.e., a pixel where it is determined that the ink of the first color is to be discharged. The predetermined threshold matrix after the offset as described above is used, whereby it is likely that it is determined that the ink of the second color is to be discharged to a pixel where it is determined that the ink of the first color is not to be discharged. Thus, graininess caused by applying the ink of the first color and the ink of the second color in a superimposed manner is less conspicuous. In the following description, for the sake of simplicity, such a process involving the offset of a threshold matrix between a plurality of colors is referred to as an "inter-color process".

Meanwhile, in recent years, to reduce graininess in a region on a recording medium where a low-gradation (high-lightness) image is recorded, a technique for using a light-color ink in addition to inks of cyan, magenta, yellow, and black (hereinafter also referred to as "basic color inks") is known. The light-color ink is used, whereby it is possible to make graininess caused by discharging inks to only a pixel region including a small number of pixels less likely to occur. In a case where the basic color inks are used without using the light-color ink, a low-gradation image is reproduced by discharging the basic color inks to a pixel region including a small number of pixels (e.g., a ⅛-pixel region). In contrast, in a case where the light-color ink is used, the low-gradation image is reproduced by discharging the light-color ink to a relatively large number of pixels (e.g., a ⅘-pixel region). Consequently, when an equivalent lightness is reproduced, it is possible to increase the coverage on the surface of paper while making it difficult to visually confirm an ink drop on the surface of the paper. This reduces the graininess of the image.

Conventionally, as the light-color ink as described above, generally, a gray ink having a black hue, a light cyan ink having a cyan hue, or a light magenta ink having a magenta hue is used. In recent years, however, a technique for using a light-color ink other than the above light-color inks is also known. Japanese Patent Application Laid-Open No. 2017-35793 discusses a technique for using as a light-color ink a light blue ink having a hue between cyan and magenta and a lightness higher than those of cyan and magenta. In a blue hue, which is a secondary color of cyan and magenta, graininess is particularly conspicuous because the lightnesses of the cyan and magenta inks themselves are relatively low. If the light cyan ink and the light magenta ink are used, it is possible to reduce graininess caused by recording a low-gradation image in the blue hue, but it is necessary to further use two types of inks in addition to the basic color inks. This increases the cost. In contrast, if the light blue ink discussed in Japanese Patent Application Laid-Open No. 2017-35793 is used, even when a low-gradation image in the blue hue in which graininess is conspicuous is recorded, it is possible to record an image in which graininess is less conspicuous, using a single type of ink.

However, it has been found that in a case where the light blue ink discussed in Japanese Patent Application Laid-Open No. 2017-35793 is used, if the process discussed in Japanese Patent Application Laid-Open No. 2017-38127 is performed, it is not possible to sufficiently reduce graininess.

In Japanese Patent Application Laid-Open No. 2017-38127, in a case where the gray ink is used as a light-color ink in addition to the basic color inks, black, cyan, and gray are grouped into a first group, and magenta and yellow are grouped into a second group. Then, the inter-color process is performed among black, cyan, and gray using a first threshold matrix, and the inter-color process is performed between magenta and yellow using a second threshold matrix different from the first threshold matrix in the placement of thresholds. Thus, it is possible to discharge the inks of black, cyan, and gray to exclusive pixels, and it is also possible to discharge the inks of magenta and yellow to exclusive pixels.

Regarding the application amounts of the respective color inks for reproducing gradations in the black hue (a so-called gray line), in a case where the gray ink is used, larger amounts of the black and gray inks, which have the black hue, than the cyan, magenta, and yellow inks are applied. Particularly, when a low-gradation (high-lightness) image in the black hue is recorded, almost only the gray ink is used. Thus, in the inter-color process in Japanese Patent Application Laid-Open No. 2017-38127, in a low gradation region of the black hue, image data of the gray ink has a high value, but pieces of image data of the other inks have low values. Thus, it is hardly determined that the other inks are to be discharged in the first place. Thus, even if the inter-color process in Japanese Patent Application Laid-Open No.

2017-38127 is performed, the gray ink is not applied in a superimposed manner with the inks of the other colors. Thus, graininess is less conspicuous.

SUMMARY OF THE INVENTION

One aspect of the embodiments is directed to, in a case where an image is recorded using a certain color material and a color material which has a hue complementary to that of the certain color material, suppressing the graininess of an image in a low gradation region of a black hue.

According to an aspect of the embodiments, an image processing apparatus for, to record an image on a recording medium using a plurality of color materials including a first color material and a second color material which has a hue complementary to that of the first color material, processing image data corresponding to the image includes a conversion unit and a generation unit. The conversion unit is configured to convert the image data into pieces of color material data corresponding to the plurality of color materials. The generation unit is configured to, based on the converted pieces of color material data, generate recording data to be used to record the plurality of color materials. The conversion unit converts predetermined image data indicating a color that is an achromatic color and has a gradation less than or equal to an intermediate gradation in a gradation range for color reproduction, into the pieces of color material data such that a recording amount of the first color material and a recording amount of the second color material are larger than a recording amount of a color material different from the first and second color materials among the plurality of color materials. The generation unit generates the recording data such that a pixel where it is determined according to the recording data that the first color material is to be recorded and a pixel where it is determined according to the recording data that the second color material is to be recorded are at positions different from each other.

Further features of the disclosure will become apparent from the following description of exemplary embodiments with reference to the attached drawings.

BRIEF DESCRIPTION OF THE DRAWINGS

FIGS. 8A, 8B, and 8C are diagrams illustrating threshold matrices according to the exemplary embodiment.

DESCRIPTION OF THE EMBODIMENTS

Figure 1A:
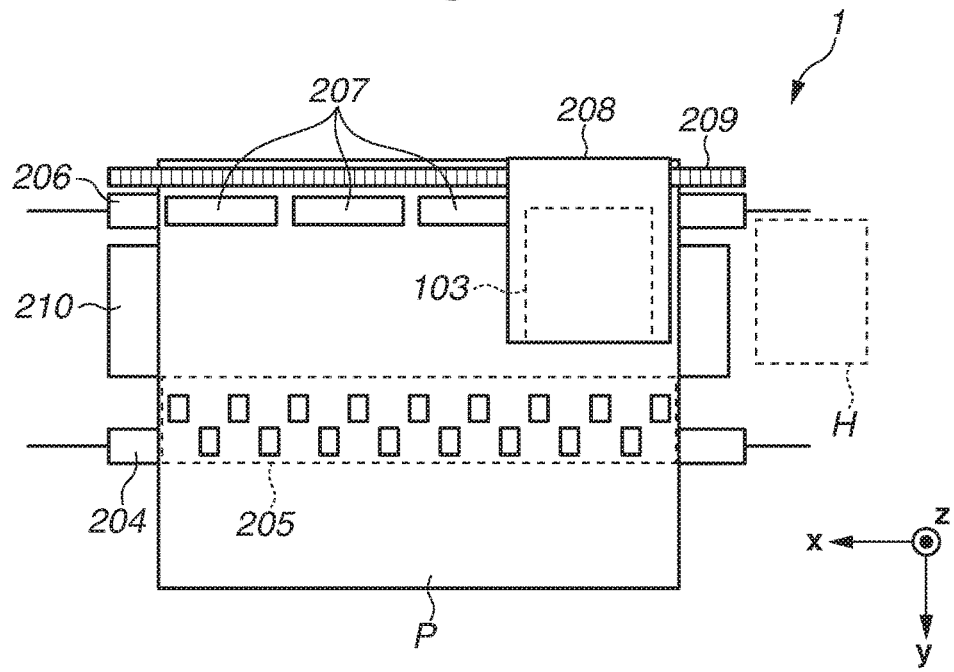
FIGS. 1A and 1B are diagrams illustrating an internal configuration of a recording apparatus according to an exemplary embodiment.

In a case where the light blue ink discussed in Japanese Patent Application Laid-Open No. 2017-35793 is used, when a low gradation region of the black hue is recorded, it is necessary to use not only the light blue ink but also the yellow ink. This is because, to reproduce the black hue, which is an achromatic color, it is necessary to mix yellow, which has a hue complementary to that of light blue.

Suppose that the light blue ink is used instead of the gray ink in Japanese Patent Application Laid-Open No. 2017-38127. As a result, the light blue ink belongs to the first group, and the yellow ink belongs to the second group. In the inter-color process in Japanese Patent Application Laid-Open No. 2017-38127, it is possible to suppress the application of the inks of the respective colors in a superimposed manner in the same group. However, inks are applied in a superimposed manner to some extent between different groups. Thus, in a low gradation region of the black hue in which large amounts of the light blue ink and the yellow ink are used, the light blue ink and the yellow ink are applied in a superimposed manner to the same pixel region. Thus, graininess is conspicuous.

A case has been described where the yellow ink and the light blue ink are used. However, in a case where a certain basic color ink and an ink which has a hue complementary to that of the certain basic color ink are used, a similar problem can occur. For example, a similar problem can also occur in a case where the cyan ink and a light red ink are used, or in a case where the magenta ink and a light green ink are used.

(Hues and Lightnesses of Inks)

In the present exemplary embodiment, recording is performed using a light blue ink in addition to a cyan ink, a magenta ink, a yellow ink, and a black ink.

The light blue ink used in the present exemplary embodiment has a hue relatively close to a blue hue reproduced by mixing the same amounts of the cyan ink and the magenta ink and also has a relatively high lightness (low density). Specifically, the light blue ink used in the present exemplary embodiment satisfies the conditions that the hue is between those of the cyan ink and the magenta ink, and the lightness is higher than those of the cyan ink and the magenta ink. The light blue ink satisfying such conditions is used, whereby, when a low-density region of the blue hue, i.e., a region where the discharged amount of ink is small, is recorded, it is possible to reproduce the blue hue without superimposing the cyan ink and the magenta ink.

The hue angles and the lightnesses of the inks of the respective colors used in the present exemplary embodiment are illustrated below in [table 1], where the hue angle of the cyan ink is h1, the lightness of the cyan ink is L1, the hue angle of the magenta ink is h2, the lightness of the magenta ink is L2, the hue angle of the light blue ink is h3, the lightness of the light blue ink is L3, the hue angle of the black ink is h4, the lightness of the black ink is L4, the hue angle of the yellow ink is h5, and the lightness of the yellow ink is L5.

TABLE 1

| | h | L |
|---|---|---|
| Cyan | h1 = 228 | L1 = 63 |
| Magenta | h2 = 348 | L2 = 61 |
| Light blue | h3 = 299 | L3 = 68 |
| Black | h4 = 229 | L4 = 36 |
| Yellow | h5 = 92 | L5 = 90 |

As can be understood from [table 1], the light blue ink used in the present exemplary embodiment satisfies the following conditions. The hue angle h3 of the light blue ink is between the hue angle h1 of the cyan ink and the hue angle h2 of the magenta ink. Further, the lightness L3 of the light blue ink is higher than the lightness L1 of the cyan ink and also higher than the lightness L2 of the magenta ink.

Figure 1B:
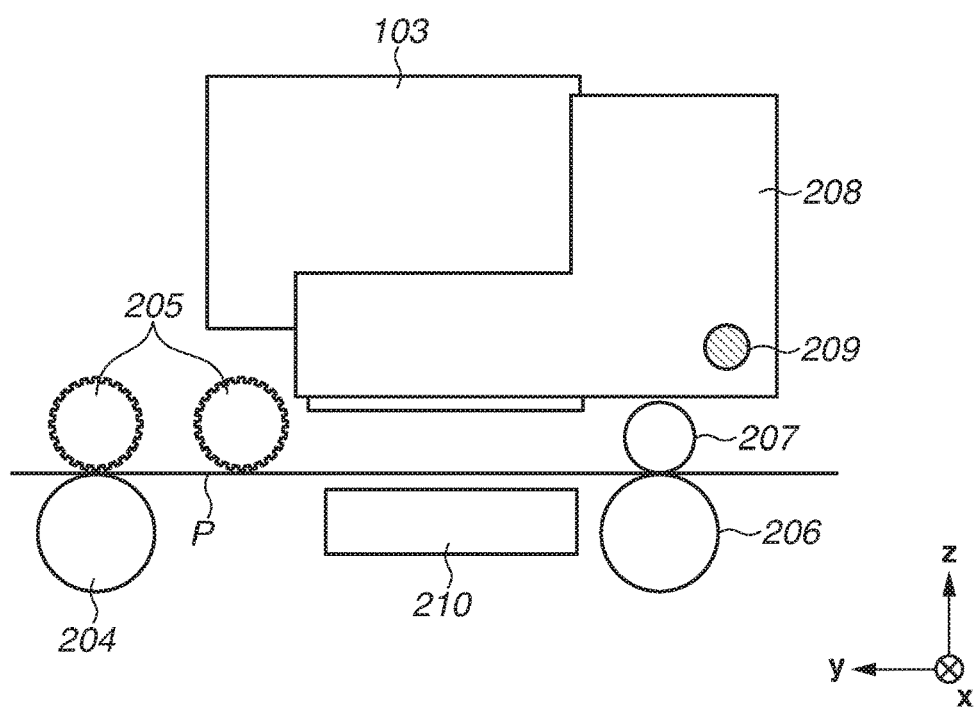

FIGS. 1A and 1B are diagrams illustrating the internal configuration of an inkjet recording apparatus (hereinafter also referred to as "recording apparatus") 1 according to the present exemplary embodiment. FIG. 1A is a top view of the recording apparatus 1. FIG. 1B is a side cross-sectional view of the recording apparatus 1.

In the state where a recording medium P, which is supplied into the recording apparatus 1, is nipped by a first roller pair including a conveying roller 206 and a pinch roller 207, and a second roller pair including a discharge roller 204 and a spur 205, the recording medium P is conveyed in a +Y direction (a conveying direction) according to the rotation of these roller pairs. Between the first and second roller pairs, a carriage 208 is provided, which can move back and forth in an X direction (a scanning direction) while a recording head 103 is mounted on the carriage 208. The carriage 208 is guided and supported by a guide shaft 209. While the carriage 208 and the recording head 103 move in the X direction, the inks are discharged in a −Z direction from the recording head 103 according to recording data described below. After the movement of the recording head 103 involving the discharge of the inks is performed, the conveying roller 206 and the discharge roller 204 rotate to convey the recording medium P in the +Y direction. The movement of the recording head 103 involving the discharge of the inks and the conveyance of the recording medium P as described above are alternately repeated, thereby forming an image on the recording medium P step by step. The recording medium P located in a region where recording is performed by the recording head 103 is supported by a platen 210 from the back surface of the recording medium P such that the recording surface of the recording medium P is kept smooth.

On the recording head 103, ink tanks for supplying the inks of the respective colors containing color materials of the respective colors are mounted. When the process of maintaining the recording head 103 is performed, the carriage 208 moves to a home position H. At the home position H, various mechanisms for performing a suction process, a wiping process, and a preliminary discharge process on the recording head 103 are provided.

(Recording Head)

Figure 2:
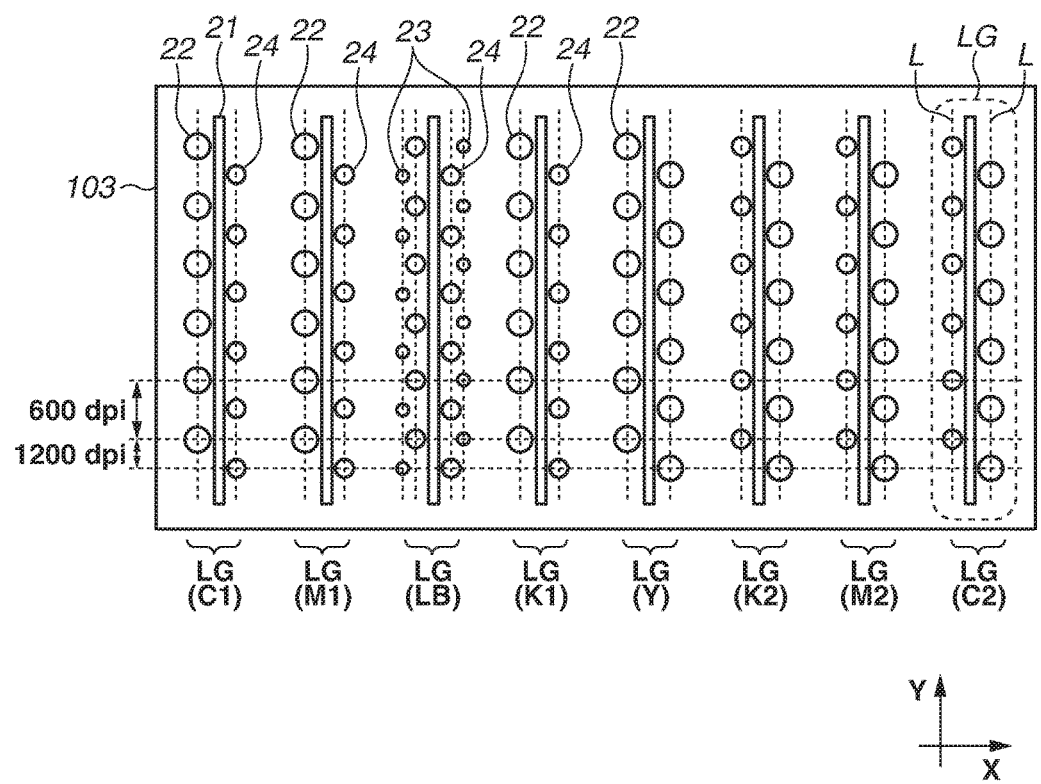
FIG. 2 is an enlarged view of a recording head according to the exemplary embodiment.

FIG. 2 is an enlarged view illustrating a discharge port formation portion of the recording head 103.

In the recording head 103 according to the present exemplary embodiment, a total of eight common liquid chambers 21 are formed, which are connected to the ink tanks. In each of the common liquid chambers 21, a single discharge port array group LG is formed. Then, each of the discharge port array groups LG includes a plurality of discharge port arrays, and the diameters of discharge ports (discharge port diameters) placed in the discharge port arrays differ in each discharge port array group.

Each discharge port opens through a nozzle plate connected to a member (hereinafter also referred to as a "common liquid chamber formation member") forming the common liquid chamber 21. In the common liquid chamber formation member, an electrothermal conversion element (hereinafter also referred to as a "recording element" or a "heater") is placed at a position opposed to each discharge port.

The discharge port array groups LG will be described in detail below.

1. Discharge Port Array Group of Yellow Ink

In the recording head 103 according to the present exemplary embodiment, only a single discharge port array group of the yellow ink is provided (LG (Y)). The discharge port array group LG (Y) of the yellow ink includes two discharge port arrays.

Figure 3A:
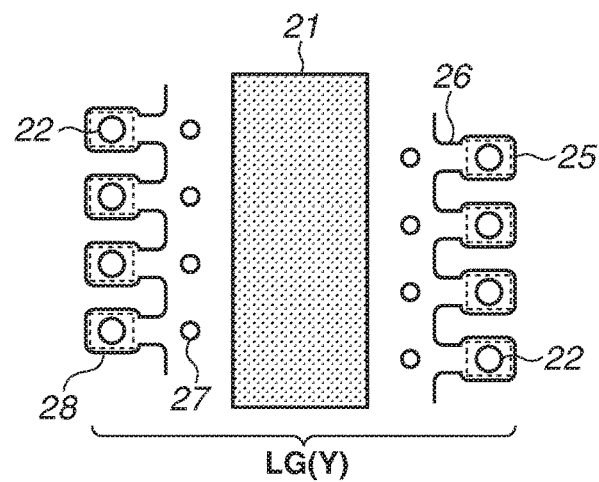
FIGS. 3A, 3B, and 3C are diagrams illustrating discharge port formation surfaces in the recording head according to the exemplary embodiment.

FIG. 3A is a diagram illustrating the details of the discharge port array group LG (Y) of the yellow ink.

In the discharge port array group LG (Y) of the yellow ink, two discharge port arrays are provided on both sides of the common liquid chamber 21. The discharge port arrays include relatively large discharge ports 22, each of which has a discharge port diameter of about 16 μm and from each of which an ink drop having a size of about 5 pl is discharged. In each of the discharge port arrays, 264 discharge ports 22 are arranged at intervals of 600 dpi (about 42.3 μm) in a Y direction. Further, the discharge port arrays are placed by being shifted from each other at a distance of 1200 dpi (about 21.2 μm) in the Y direction.

As described above, heaters 28 are provided at positions opposed to the discharge ports 22. Further, bubble generation chambers 25 are provided to surround the heaters 28. Ink flow paths 26 are provided to connect the bubble generation chambers 25 and the common liquid chamber 21. Further, to prevent foreign matter in the ink from entering the ink flow paths 26, foreign matter inhibition columns 27 are provided. The configurations of the heaters 28, the bubble generation chambers 25, the ink flow paths 26, and the foreign matter inhibition columns 27 are also similar in the other discharge port array groups, and therefore are not described below.

2. Discharge Port Array Groups of Black Ink, Cyan Ink, and Magenta Ink

In the recording head 103 according to the present exemplary embodiment, two discharge port array groups of the black ink are provided (LG (K1) and LG (K2)). Each of the discharge port array groups LG (K1) and LG (K2) of the black ink includes two discharge port arrays.

Figure 3B:
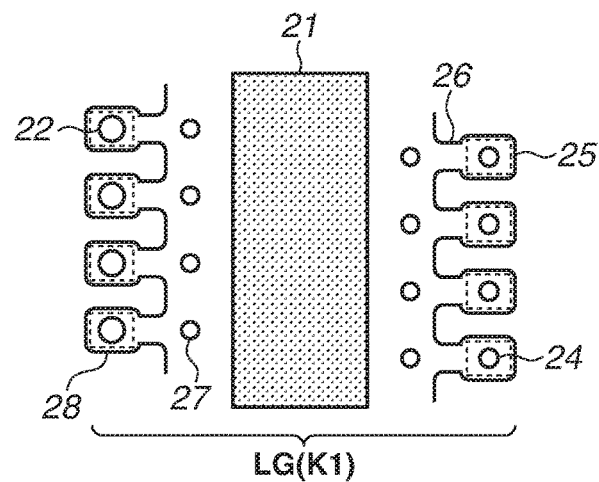

FIG. 3B is a diagram illustrating the details of the discharge port array group LG (K1) of the black ink.

In the discharge port array group LG (K1) of the black ink, a single discharge port array is provided on one side (the left side) of the common liquid chamber 21. The discharge port array includes relatively large discharge ports 22, each of which has a discharge port diameter of about 16 μm and from each of which an ink drop having a size of about 5 pl is discharged. Further, a single discharge port array is provided on the other side (the right side) of the common liquid chamber 21. The discharge port array includes medium-sized discharge ports 24, each of which has a discharge port diameter of about 12 μm and from each of which an ink drop having a size of about 2 pl is discharged. In the discharge port arrays, 264 discharge ports 22 and 264 discharge ports 24 are arranged at intervals of 600 dpi (about 42.3 µm) in the Y direction. Further, the discharge port arrays are placed by being shifted from each other at a distance of 1200 dpi (about 21.2 µm) in the Y direction.

Similar to the discharge port array group LG (K1), the discharge port array group LG (K2) of the black ink also includes a discharge port array in which each discharge port has a diameter of about 16 µm, and a discharge port array in which each discharge port has a diameter of about 12 µm. The two discharge port array groups LG (K1) and LG (K2), however, are different from each other in that the placement in an X direction of the two discharge port arrays placed in each of the discharge port array groups LG (K1) and LG (K2) is opposite. Two discharge port arrays including discharge ports having the same diameter between the discharge port array groups LG (K) and LG (K2) are provided at positions shifted from each other at a distance of 1200 dpi (about 21.2 µm) in the Y direction.

A discharge port array group LG (C1) of the cyan ink and a discharge port array LG (M1) of the magenta ink have configurations similar to that of the discharge port array group LG (K1) of the black ink. A discharge port array group LG (C2) of the cyan ink and a discharge port array LG (M2) of the magenta ink have configurations similar to that of the discharge port array group LG (K2) of the black ink.

3. Discharge Port Array Group of Light Blue Ink

In the recording head 103 according to the present exemplary embodiment, a single discharge port array group of the light blue ink is provided (LG (LB)). The discharge port array group LG (LB) of the light blue ink includes four discharge port arrays.

Figure 3C:
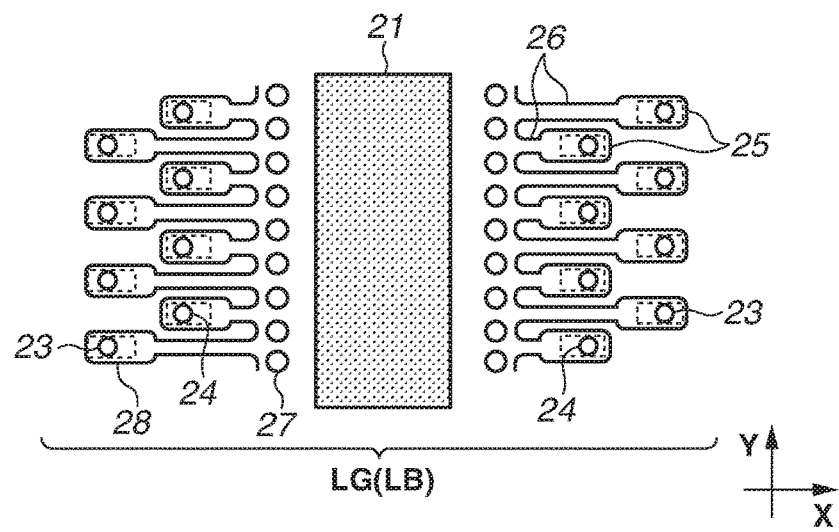

FIG. 3C is a diagram illustrating the details of the discharge port array group LG (LB) of the light blue ink.

As illustrated in FIG. 3C, in the discharge port array group LG (LB) of the light blue ink, two discharge port arrays are provided on one side (the left side) of the common liquid chamber 21. One of the discharge port arrays includes medium-sized discharge ports 24, each of which has a discharge port diameter of about 12 µm and from each of which an ink drop having a size of about 2 pl is discharged. This discharge port array is provided at a position closer to the common liquid chamber 21. The other discharge port array includes relatively small discharge ports 23, each of which has a discharge port diameter of about 9 µm and from each of which an ink drop having a size of about 1 pl is discharged. This discharge port array is provided at a position distant from the common liquid chamber 21. Similarly, two discharge port arrays are provided also on the other side (the right side) of the common liquid chamber 21. One of the discharge port arrays includes discharge ports 24, each of which has a discharge port diameter of about 12 µm. The other discharge port array includes discharge ports 23, each of which has a discharge port diameter of about 9 µm. As described above, in the discharge port array group LG (LB) of the light blue ink, a total of four discharge port arrays, i.e., two discharge port arrays in which each discharge port has a diameter of about 12 µm and two discharge port arrays in which each discharge port has a diameter of about 9 µm, are provided.

In the discharge port arrays, 264 discharge ports 23 and 264 discharge ports 24 are arranged at intervals of 600 dpi (about 42.3 µm) in the Y direction. The two discharge port arrays (a discharge port array in which each discharge port has a diameter of about 12 µm and a discharge port array in which each discharge port has a diameter of about 9 µm) located on the same side with respect to the common liquid chamber 21 are placed by being shifted from each other at a distance of 1200 dpi (about 10.6 µm) in the Y direction.

4. Placement Order of Discharge Port Array Groups in Chip

As illustrated in FIG. 2, the recording head 103 according to the present exemplary embodiment is formed by placing the above discharge port array groups in the order of the discharge port array group LG (C1) of the cyan ink, the discharge port array group LG (M1) of the magenta ink, the discharge port array group LG (LB) of the light blue ink, the discharge port array group LG (K1) of the black ink, the discharge port array group LG (Y) of the yellow ink, the discharge port array group LG (K2) of the black ink, the discharge port array group LG (M2) of the magenta ink, and the discharge port array group LG (C2) of the cyan ink from the left.

(Recording Control System)

Figure 4:
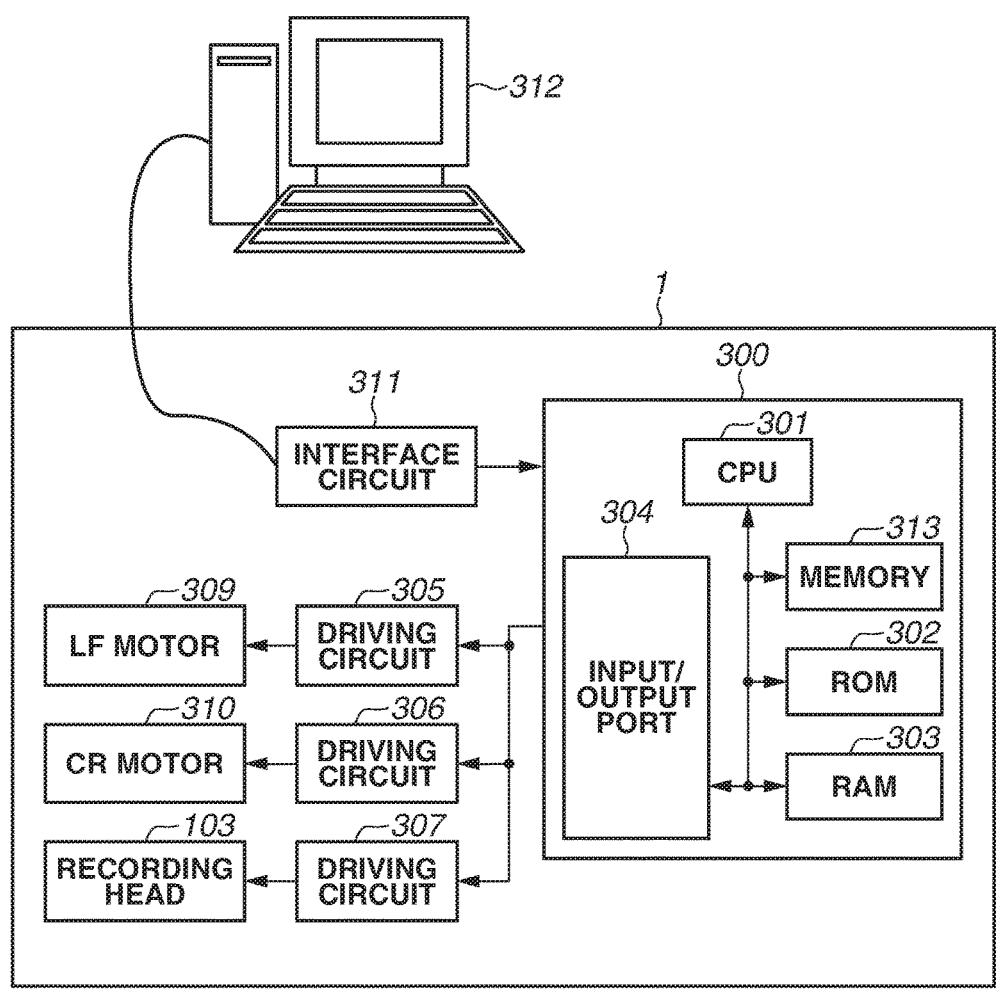
FIG. 4 is a diagram illustrating a recording control system according to the exemplary embodiment.

FIG. 4 is a block diagram illustrating the schematic configuration of a recording control system in the recording apparatus 1 according to the present exemplary embodiment. A main control unit 300 includes a central processing unit (CPU) 301, which executes processing operations such as calculation, selection, distinction, and control and a recording operation, a read-only memory (ROM) 302, which stores a control program to be executed by the CPU 301, a random-access memory (RAM) 303, which is used as a buffer for recording data, and an input/output port 304. A memory 313 stores image data, a mask pattern, and a quantization pattern. Then, the input/output port 304 is connected to driving circuits 305, 306, and 307 for a conveying motor (line feed (LF) motor) 309, a carriage (CR) motor 310, and an actuator in the recording head 103. The main control unit 300 is connected to a personal computer (PC) 312, which is a host computer, via an interface circuit 311.

(Image Processing)

Figure 5:
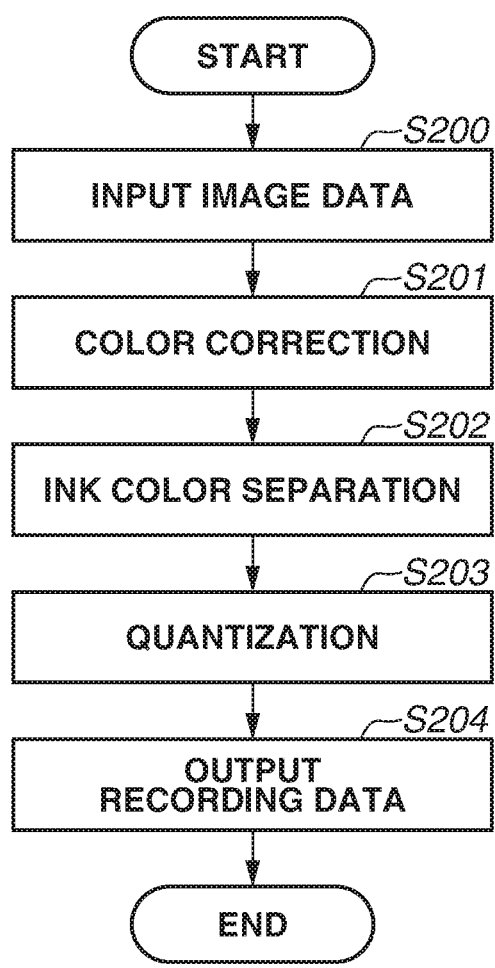
FIG. 5 is a diagram illustrating image processing according to the exemplary embodiment.

FIG. 5 is a flowchart illustrating processing on image data according to the present exemplary embodiment. The processing is executed by the CPU 301, which is included in the main control unit 300, according to a program stored in the ROM 302. In FIG. 5, in step S200, image data of a pixel of interest is input from the host computer 312. Then, first, in step S201, the main control unit 300 executes color correction. At this time, the image data input from the host computer 312 is 8-bit luminance data of red (R), green (G), and blue (B) for representing a standardized color space such as standard Red Green Blue (sRGB). In step S201, the luminance data is converted into 12-bit luminance data of RGB corresponding to a color space specific to the recording apparatus 1. As a method for converting a signal value, a known method such as referencing a lookup table (LUT) stored in advance in the ROM 302 can be employed.

In step S202, the main control unit 300 separates the converted RGB data into pieces of 16-bit gradation data (color material data or ink data) of cyan (C), magenta (M), yellow (Y), black (Bk), and light blue (LB), which are the ink colors of the recording apparatus 1. Also in the ink color separation process, similar to the color correction process, an LUT stored in advance in the ROM 302 can be referenced. An example of the ink color separation process will be described in detail below.

In step S203, the main control unit 300 performs a predetermined quantization process on the 16-bit gradation data corresponding to each of the ink colors, thereby converting the 16-bit gradation data into 1-bit recording data. The quantization process will be described in detail below. Then, in step S204, the main control unit 300 outputs the recording data as data to be used for recording. Thus, the image processing illustrated in FIG. 5 ends.

Although the form has been described above in which all the processes of steps S200 to S204 are executed by the CPU 301 in the recording apparatus 1, another form can also be carried out. Alternatively, for example, the form may be such that all the processes of steps S200 to S204 are executed by the host computer 312. Yet alternatively, the form may be such that, for example, the processes up to the ink color separation process (step S202) are executed by the host computer 312, and the quantization process (step S203) and the subsequent process are executed by the recording apparatus 1.

(Ink Color Separation Process)

In the present exemplary embodiment, the ink color separation process in a case where gradations from white through gray to black, i.e., colors on a so-called gray line, are reproduced will be described in detail.

Figure 6:
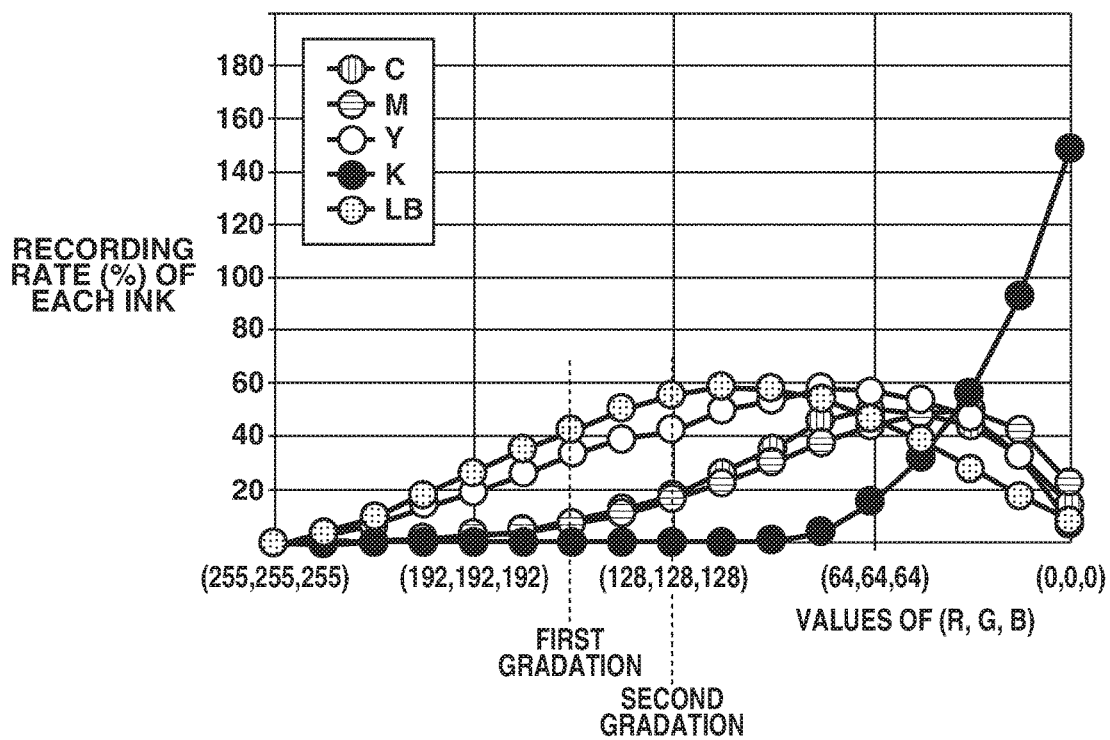
FIG. 6 is a diagram illustrating recording rates of inks in each density gradation according to the exemplary embodiment.

FIG. 6 illustrates the recording rates of the respective color inks to be used to reproduce the gray line as a result of the ink color separation process according to the present exemplary embodiment. In FIG. 6, the vertical axis represents the recording rate of the ink of each color, and the horizontal axis represents a gradation range for reproducing colors. Gradations are represented by RGB values corresponding to the colors on the gray line. The recording rate of each ink is defined by the ratio of the actual recording amount of the ink to the recording amount of the ink in a case where the ink is applied once to all pixels. FIG. 6 illustrates RGB data of the gray line, i.e., a black hue. Thus, in each gradation, the R value, the G value, and the B value are values that are the same as one another. For example, the gradation at the left end of the horizontal axis corresponds to white, and (R, G, B)=(255, 255, 255). On the other hand, the gradation at the right end corresponds to black, and (R, G, B)=(0, 0, 0). Further, the gradation in the middle (the center) of the gradation range corresponds to gray, and (R, G, B)=(128, 128, 128). The density reproduced in this case is referred to as an "intermediate density".

As can be understood from FIG. 6, in the present exemplary embodiment, in a low gradation region (from white to gray) of the black hue, large amounts of the light blue and yellow inks are used, and the cyan, magenta, and black inks are hardly used. In the low gradation region, the covered area of the recording medium can be made larger and graininess can be made less conspicuous by applying a large amount of an ink having a high lightness than by applying a small amount of a dot of an ink having a low lightness. Thus, in the low gradation region, a large amount of the light blue ink, which is a light-color ink, is used.

Meanwhile, since the light blue ink has the blue hue, the black hue, which is an achromatic color, cannot be reproduced using the light blue ink alone. Thus, in the present exemplary embodiment, the black hue is reproduced using the yellow ink, which has a hue complementary to that of the blue, together with the light blue ink.

On the other hand, in a high gradation region (from gray to black) of the black hue, certain amounts of the other inks are also used. However, the higher the gradation, the larger the use amount of the black ink. In the high gradation region, large amounts of inks are already applied, and there is hardly a blank portion on the recording medium. Thus, even if a dot of an ink having a low lightness is formed, graininess is not very conspicuous. The high gradation region cannot be reproduced using an ink having a high lightness alone because the ink does not have a sufficient density. Thus, in the high gradation region, a large amount of the black ink, which has a low lightness, is used.

(Quantization Process)

As described with reference to FIG. 6, in a case where recording is performed using the light blue ink without using the gray ink, the light blue ink and the yellow ink are mainly used to record an image in the low gradation region on the gray line. Thus, if the quantization process is performed so that the light blue ink and the yellow ink are to be discharged to the same pixel region, the light blue ink and the yellow ink are superimposed on each other, and graininess is conspicuous.

In view of this point, in the present exemplary embodiment, the quantization process is executed so that the light blue ink and the yellow ink are to be discharged to different pixel regions.

Figure 7:
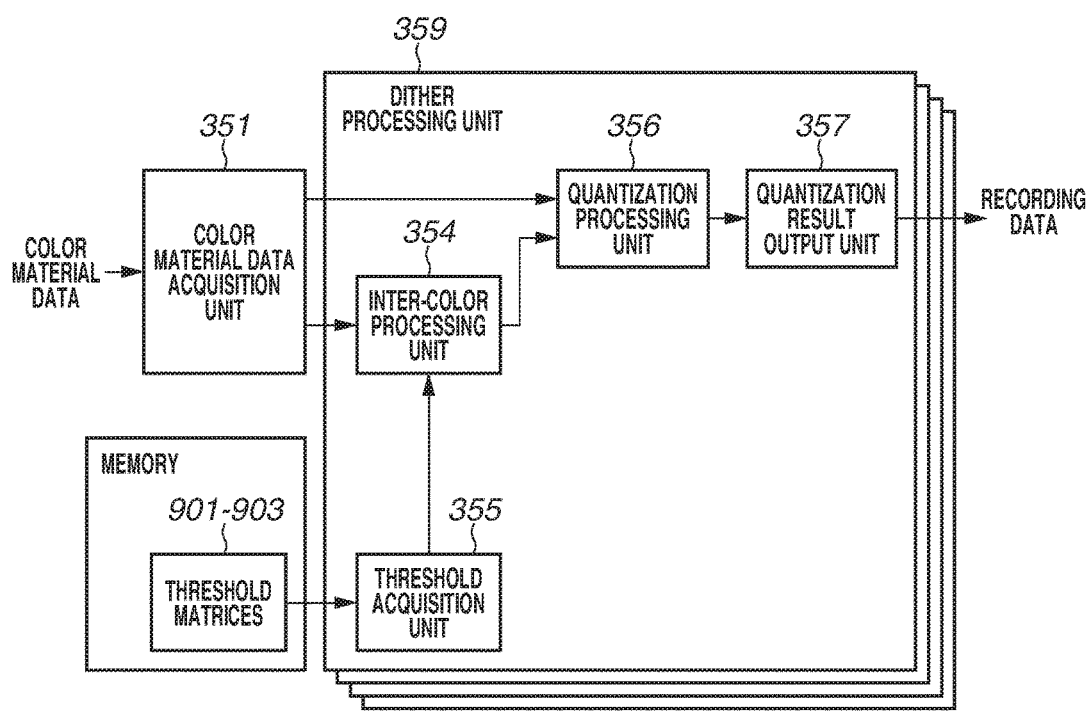
FIG. 7 is a diagram illustrating a quantization process according to the exemplary embodiment.

FIG. 7 is a diagram illustrating the details of the quantization process executed in the present exemplary embodiment. In the quantization process according to the present exemplary embodiment, first, a process regarding the input values of pieces of color material data corresponding to the respective colors, i.e., cyan, magenta, yellow, black, and light blue, is performed. Next, a process regarding a threshold is performed. Finally, a quantization process by a dither method is performed. This series of processes is subjected to parallel processing with respect to each color (each channel). With reference to FIG. 7, the series of processes will be described in detail below.

A color material data acquisition unit 351 acquires 12-bit (4096-gradation) color material data indicating a gradation at each of a plurality of pixels. The color material data acquisition unit 351 according to the present exemplary embodiment can receive signals using up to 12 bits for eight colors. This example illustrates the state where pieces of 12-bit data for the five colors, i.e., cyan, magenta, yellow, black, and light blue, are input.

Next, in a dither processing unit 359, among the pieces of 12-bit data for the five colors, 12-bit data to be quantized (hereinafter referred to as "processing target data") is transmitted as it is to a quantization processing unit 356.

On the other hand, among the pieces of 12-bit data for the colors other than that of the processing target data, 12-bit data of a particular color is input as reference data to an inter-color processing unit 354. The color of the reference data to be used for the processing target data of each color is determined in advance. This will be described in detail below.

Then, based on the reference data, the inter-color processing unit 354 performs an inter-color process on a threshold at each pixel acquired from threshold matrices 901 to 903 by a threshold acquisition unit 355, thereby determining a final threshold. Then, the inter-color processing unit 354 transmits the final threshold to the quantization processing unit 356. This inter-color process and the threshold matrices 901 to 903 will be described in detail below.

Then, the quantization processing unit 356 compares the processing target data with the threshold input from the inter-color processing unit 354 with respect to each pixel. If the value of the processing target data is equal to or greater than the threshold, the quantization processing unit 356 determines with respect to each pixel that the ink corresponding to the processing target data is to be discharged (the color material corresponding to the processing target data is to be recorded). If the value of the processing target data is smaller than the threshold, the quantization processing unit 356 determines with respect to each pixel that the ink corresponding to the processing target data is not to be discharged (the color material corresponding to the processing target data is not to be recorded). Then, the quantization processing unit 356 transmits binary data generated as a result of the determination to a quantization result output unit 357. Then, with respect to each ink color, the quantization result output unit 357 puts together the quantization results obtained by the quantization processing unit 356 at the respective pixels and transmits the quantization results as recording data.

(Threshold Matrices)

In the present exemplary embodiment, the quantization process is executed using three threshold matrices.

FIGS. 8A, 8B, and 8C are respective diagrams illustrating a first threshold matrix 901, a second threshold matrix 902, and a third threshold matrix 903, which are used in the present exemplary embodiment. For the sake of simplicity, FIGS. 8A, 8B, and 8C illustrate regions including 10 pixels× 10 pixels in the threshold matrices 901 to 903. Actually, however, the threshold matrices 901 to 903 have a size of 512 pixels×512 pixels.

For each pixel of each of the threshold matrices 901 to 903, any of thresholds "1" to "4095" is set. Further, almost the same numbers of the thresholds "1" to "4095" are placed in each threshold matrix.

In the first threshold matrix 901 in FIG. 8A, thresholds are placed to have blue noise characteristics. Specifically, thresholds are placed at the pixels in the first threshold matrix 901 such that dispersiveness is high at the pixels where the thresholds "1" to "512" are set, i.e., the pixels where it is likely that it is determined according to the recording data that the ink is to be discharged (1) even if the gradation value of the color material data is low. In the above description, when thresholds are placed such that dispersiveness is high at the pixels where the thresholds "1" to "512" among the thresholds "1" to "4095" are set, the thresholds have blue noise characteristics. Alternatively, thresholds may be placed such that the dispersiveness of thresholds in another range is high. For example, when thresholds are placed such that dispersiveness is high at the pixels where the thresholds "1" to "1024" are set, the thresholds may have blue noise characteristics.

Similarly, also in the third threshold matrix 903 in FIG. 8C, thresholds are placed to have blue noise characteristics. However, the placement of the thresholds in the third threshold matrix 903 is different from the placement of the thresholds in the first threshold matrix 901.

Meanwhile, in the second threshold matrix 902 in FIG. 8B, thresholds are placed at the pixels such that at each pixel, the sum of the threshold in the first threshold matrix 901 and the threshold in the second threshold matrix 902 is a fixed value (=4096). For example, the threshold at the top left pixel in the first threshold matrix 901 is 2504, the threshold at the top left pixel in the second threshold matrix 902 is 1592, and the sum of these thresholds is 4096. That is, at each pixel, the threshold in the second threshold matrix 902 is determined by subtracting the threshold in the first threshold matrix 901 from the fixed value (4096). In the following description, for the sake of simplicity, the above relationship is the relationship where the second threshold matrix 902 is a threshold matrix obtained by inverting the first threshold matrix 901.

The threshold acquisition unit 355 acquires the threshold at each pixel from the threshold matrices 901 to 903.

(Inter-Color Process)

The details of the inter-color process executed in the present exemplary embodiment will be described.

Figure 9A:
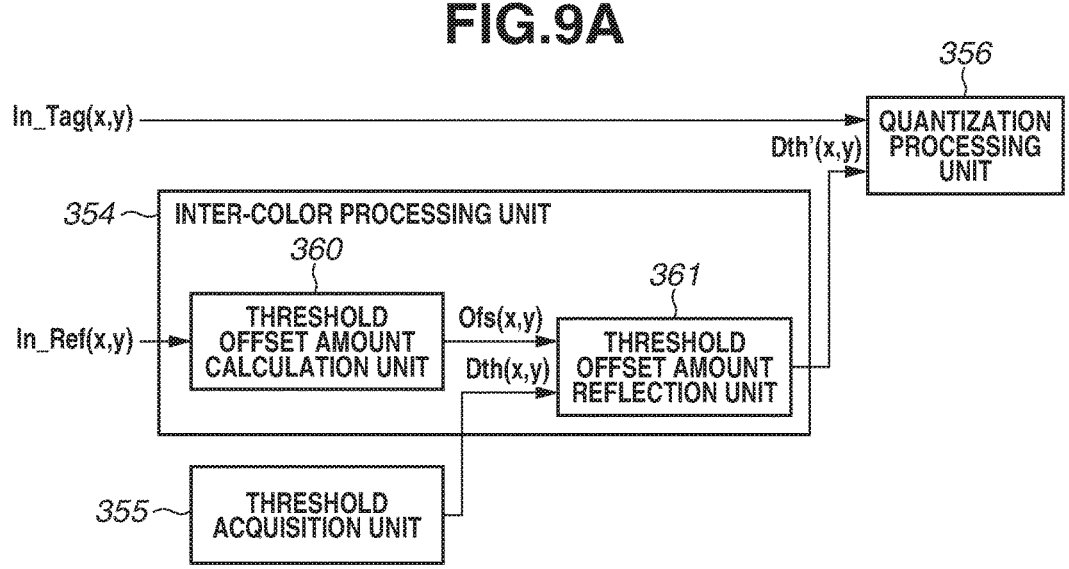
FIGS. 9A and 9B are diagrams illustrating an inter-color process according to the exemplary embodiment.
Figure 9B:
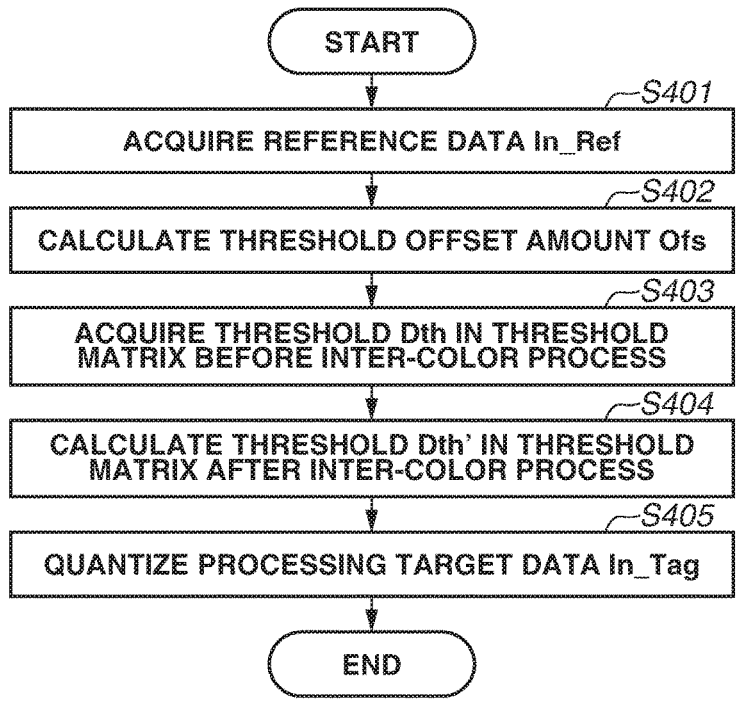

FIG. 9A is a diagram illustrating the details of the inter-color processing unit 354. FIG. 9B is a flowchart illustrating the inter-color process executed by the control program according to the present exemplary embodiment.

As illustrated in FIG. 9A, the inter-color processing unit 354 includes a threshold offset amount calculation unit 360 and a threshold offset amount reflection unit 361. In the following description, at a certain target pixel (x, y), the value of the processing target data is represented as "In_Tag (x, y)", the value of the reference data is represented as "In_Ref(x, y)", the threshold in the threshold matrix before the inter-color process is represented as "Dth(x, y)", the threshold in the threshold matrix after the inter-color process is represented as "Dth'(x, y)", and an offset amount, which will be described below, is represented as "Ofs(x, y)".

When the quantization processing unit 356 quantizes the processing target data In_Tag, in step S401, the inter-color processing unit 354 acquires the reference data In_Ref. In step S402, based on the acquired reference data In_Ref, the threshold offset amount calculation unit 360 calculates the offset amount Ofs by which the threshold in the threshold matrix is to be offset. The offset amount Ofs(x, y) at each pixel is calculated by [formula 1].

$$Ofs(x,y) = \Sigma In\_Tag(x,y) \quad \text{[formula 1]}$$

Depending on the color of the processing target data In_Tag, pieces of reference data In_Ref for a plurality of colors may be present. In [formula 1], Z indicates that if pieces of reference data In_Ref for a plurality of colors are present, the sum of the pieces of reference data In_Ref is taken. If reference data In_Ref for only a single color is present, Ofs(x, y)=In_Tag(x, y). If reference data In_Ref is not even present (the reference data In_Tag is null), Ofs(x, y)=0. If the offset amounts Ofs are calculated regarding the pieces of processing target data In_Tag for the respective colors according to [formula 1], then in step S403, next, the threshold acquisition unit 355 acquires the threshold Dth in the threshold matrix before the inter-color process. Then, in step S404, the threshold offset amount reflection unit 361 performs the process of reflecting on the threshold Dth the offset amount Ofs calculated by the threshold offset amount calculation unit 360, thereby generating the threshold Dth' in the threshold matrix after the inter-color process. The threshold Dth'(x, y) in the threshold matrix after the inter-color process at each pixel is calculated by [formula 2].

$$Dth'(x,y) = Dth(x,y) - Ofs(x,y) \quad \text{[formula 2]}$$

At this time, if the threshold Dth'(x, y) in the threshold matrix after the inter-color process calculated by [formula 2] is a negative value, the threshold Dth'(x, y) in the threshold matrix after the inter-color process is updated by the following [formula 3].

$$Dth'(x,y) = Dth'(x,y) + Dth\_Max \quad \text{[formula 3]}$$

In [formula 3], Dth'(x, y) on the left side represents the threshold in the threshold matrix after the update, and Dth'(x, y) on the right side represents the threshold in the threshold matrix after the inter-color process. Further, Dth_Max is the maximum value among the values of the thresholds in the threshold matrix. In the threshold matrices 901 to 903 used in the present exemplary embodiment, Dth_Max=4095. If the threshold Dth'(x, y) in the threshold matrix after the inter-color process is calculated by [formula 2] and [formula 3], then in step S405, the quantization processing unit 356 applies the threshold matrix after the inter-color process to the processing target data In_Tag, thereby quantizing the processing target data In_Tag. Then, with respect to each pixel, it is determined whether the ink is to be discharged (1) or not to be discharged (0). The recording data is generated as described above.

(Combinations of Processing Target Data, Threshold Matrix, and Reference Data)

[Table 1] illustrates the combination of the threshold matrix to be used and the reference data to be selected for the processing target data of the ink of each color according to the present exemplary embodiment.

TABLE 1

| Processing target data In_Tag | Black | Cyan | Magenta | Light blue | Yellow |
|---|---|---|---|---|---|
| Threshold matrix | Third threshold matrix 903 | Third threshold matrix 903 | First threshold matrix 901 | First threshold matrix 901 | Second threshold matrix 902 |
| Reference data In_Ref | Null | Black | Null | Magenta | Null |

As can be understood from [table 1], the pieces of processing target data In_Tag of black and cyan are quantized commonly using the third threshold matrix 903.

However, black is quantized without using the reference data In_Ref (null), whereas cyan is quantized using black as the reference data In_Ref. Thus, although depending on the value of the processing target data In_Tag of black, in the order from the pixel where the lowest threshold is set in the third threshold matrix 903, the recording data of the black ink is generated to determine that the black ink is to be discharged. Since the third threshold matrix 903 has blue noise characteristics, dispersiveness is high at the pixels to which the black ink is to be discharged.

Then, regarding the cyan ink, the offset amount Ofs is obtained using black as the reference data In_Ref, and the obtained offset amount Ofs is reflected on the third threshold matrix 903 based on [formula 2] and [formula 3]. At this time, the third threshold matrix 903 is commonly used for cyan and black. Thus, the threshold Dth' calculated by [formula 2] is a negative value in a case where the reference data In_Ref of black, which is the offset amount Ofs, is greater than the threshold Dth in the third threshold matrix 903, i.e., at the pixels where it is determined according to the recording data that the black ink is to be discharged. As described above, if the threshold Dth' calculated by [formula 2] is a negative value, Dth_Max is added based on [formula 3], and the threshold Dth' in the threshold matrix after the inter-color process becomes larger. Thus, it is likely that it is determined that the cyan ink is not to be discharged to the pixel where the threshold Dth' is set. That is, it is possible to discharge the cyan ink and the black ink to exclusive pixels.

As described above, the inter-color process is performed on black and cyan using a common threshold matrix, whereby it is possible to record black with high dispersiveness. Further, although the dispersiveness of cyan is somewhat lower than that of black, it is possible to discharge the ink of cyan to pixels exclusive of pixels to which the ink of black is discharged.

Further, as can be understood from [table 1], the pieces of processing target data In_Tag of magenta and light blue are quantized commonly using the first threshold matrix 901. Magenta is quantized without using the reference data In_Ref, and light blue is quantized using magenta as the reference data In_Ref. Thus, similar to the above case where the pieces of processing target data In_Tag of black and cyan are quantized, it is possible to discharge the ink of magenta with high dispersiveness and discharge the ink of light blue to pixels exclusive of pixels to which the ink of magenta is discharged.

Further, as can be understood from [table 1], the processing target data In_Tag of yellow is quantized using the second threshold matrix 902 and without using the reference data In_Ref. As described above, the second threshold matrix 902 is obtained by inverting the first threshold matrix 901. Thus, for a pixel where a low threshold is set in the first threshold matrix 901, a high threshold is set in the second threshold matrix 902. Thus, the recording data is generated to determine that the yellow ink is to be discharged to a pixel where it is determined that the ink is not to be discharged, according to the recording data corresponding to magenta or light blue quantized using the first threshold matrix 901. Thus, it is possible to discharge the ink of yellow to pixels exclusive of pixels to which the inks of magenta and light blue are discharged.

The reason will be described in detail why the combination of the threshold matrix and the reference data for the processing target data of the ink of each color is determined as in [table 1].

1. Combinations in Inter-Color Process

The reason why the inter-color process is performed on the combination of black and cyan using the same threshold matrix, and the inter-color process is performed on the combination of magenta and light blue using the same threshold matrix is, as described above, to discharge inks to exclusive pixels in each combination.

Black and cyan, which are basic colors and have low lightnesses, are often simultaneously used (recording is often performed by discharging both black and cyan) particularly in the high gradation region. Thus, the inter-color process is performed on black and cyan, and the inks are applied to exclusive pixels, thereby reducing graininess in the high gradation region. Further, blue has an intermediate hue between magenta and cyan. Thus, magenta and light blue are often simultaneously used particularly to record a part of the blue hue closer to magenta. Thus, the inter-color process is also performed on magenta and light blue, thereby reducing graininess in the part of the blue hue closer to magenta.

2. Order of Inter-Color Process

As described above, in the inter-color process on black and cyan, black is quantized without using the reference data In_Ref (hereinafter also referred to as "quantized first" for the sake of simplicity), and cyan is quantized using black as the reference data In_Ref (hereinafter also referred to as "quantized next" for the sake of simplicity). Similarly, in the inter-color process on magenta and light blue, magenta is quantized first, and light blue is quantized next. This is because the ink having the lower lightness is more influenced by a decrease in image quality when the dispersiveness decreases.

In each combination, in the order from the pixel where the lowest threshold is set in the threshold matrix, it is determined that the ink of the color to be quantized first is to be discharged. Since the threshold matrices 901 and 903 used in the present exemplary embodiment have blue noise characteristics, it is determined that dispersiveness is high at a pixel where a low threshold is set. Thus, the dispersiveness of the color to be quantized first can be made high.

On the other hand, after the pixels where it is determined that the ink of the color to be quantized first is to be discharged are excluded, and in the order from the pixel where the lowest threshold is set, it is determined that the ink of the color to be quantized next is to be discharged.

Basically, it is also determined that the ink of the color to be quantized next is to be discharged to a pixel where a low threshold is set. Thus, the dispersiveness of the color to be quantized next can also be made somewhat high. However, to pixels where thresholds in the lowest range, such as 0 to 10, in the threshold matrix are set, it is determined that the ink of the color to be quantized first is to be discharged. Thus, although depending on the value of the color material data of the color to be quantized first, basically, it is determined that the ink of the color to be quantized next is not to be discharged to these pixels. Thereby, the dispersiveness of the color to be quantized next is lower than that of the color to be quantized first.

Regarding a dot obtained by applying an ink onto the recording medium, the lower the lightness, the more easily the dot is visually confirmed. Thus, a decrease in image quality is more conspicuous when the dispersiveness of an ink having a low lightness is low, than when the dispersiveness of an ink having a high lightness is low. Thus, the colors having the lower lightnesses, i.e., black between black and cyan, and magenta between magenta and light blue, are set as the colors to be quantized first, thereby suppressing a decrease in image quality.

3. Yellow Ink

In a case where the light blue ink is used, when the low gradation region of the black hue is recorded, it is necessary to use the ink of yellow, which has a hue complementary to that of blue. Thus, as described with reference to FIG. 6, in the low gradation region of the black hue, larger amounts of the inks of light blue and cyan than inks in other combinations are used. Thus, if the light blue ink and the cyan ink are applied in a superimposed manner to the same pixel, graininess is conspicuous in the low gradation region of the black hue, and a decrease in image quality occurs.

In response, in the present exemplary embodiment, the yellow ink is quantized using the second threshold matrix 902 obtained by inverting the first threshold matrix 901 used for the light blue ink. Thus, the yellow ink is likely to be discharged to a pixel different from a pixel to which the light blue ink is to be discharged. Thus, it is possible to reduce graininess resulting from applying the yellow ink and the light blue ink in a superimposed manner in the low gradation region of the black hue.

(Quantization Results of Processing Target Data)

The quantization results obtained by performing the quantization involving the inter-color process according to the present exemplary embodiment will be described in detail.

Figure 10:
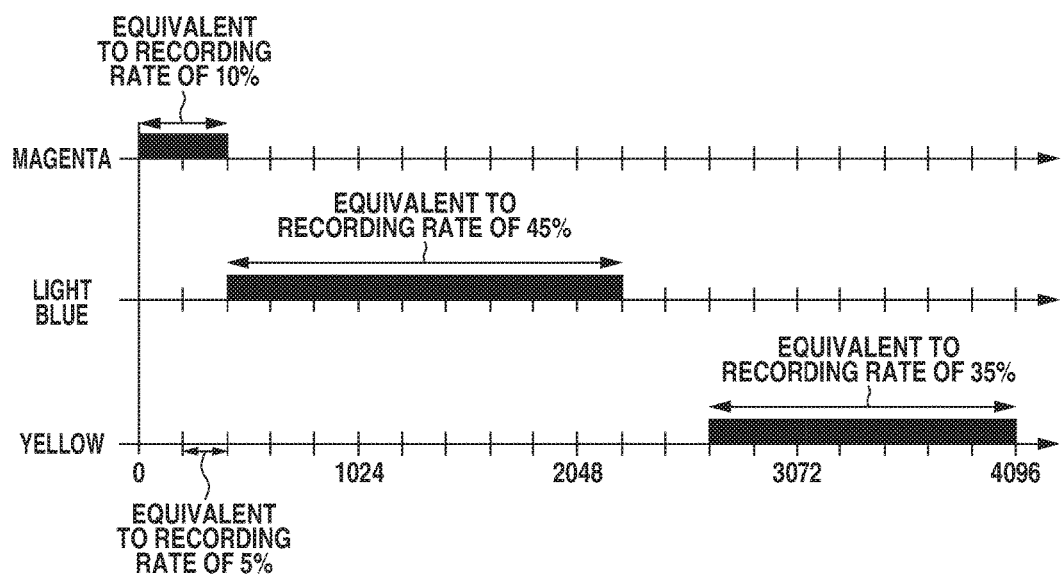
FIG. 10 is a diagram illustrating quantization results according to the exemplary embodiment.

FIG. 10 is a diagram illustrating pixels to which magenta, light blue, and yellow are to be discharged when the quantization involving the inter-color process according to the present exemplary embodiment is performed on the pieces of color material data of the respective colors corresponding to a first gradation (R, G, B=160, 160, 160) in FIG. 6. In FIG. 10, the direction of each arrow corresponds to the thresholds in the first threshold matrix 901. Each scale mark corresponds to an ink recording rate of 5%, and 20 scale marks are illustrated. Thus, since the maximum value among the values of the thresholds in the first threshold matrix 901 is 4096, a single scale mark corresponds to a threshold range of about 205 (=4096/20). In these scale marks, a blacked-out region indicates a pixel to which a corresponding ink is to be applied. For example, regarding magenta, a region corresponding to two scale marks from the left end is blacked out. This means that the recording data is generated to determine that the ink of magenta is to be discharged to the pixels where the thresholds "0" to "410" (=4096×2/20) are set in the first threshold matrix 901.

As illustrated in FIG. 6, the recording rates of the inks of the respective colors in the first gradation of the black hue are about 0% for black, about 10% for cyan and magenta, about 35% for yellow, and about 45% for light blue. At this time, pixels to which the inks of magenta, light blue, and yellow are to be discharged are as illustrated in FIG. 10.

First, magenta is quantized using the first threshold matrix 901 and without using the reference data In_Ref. Since the recording rate of magenta is 10%, the recording data of magenta is generated to determine that the ink is to be discharged to the pixels where the thresholds "1" to "410" are set in the first threshold matrix 901. The threshold "410" corresponds to a recording rate of 10 (=410/4096×100) %.

Next, light blue is quantized using the first threshold matrix 901 and also using the data of magenta as the reference data In_Ref. Thus, the inter-color process is performed by offsetting the first threshold matrix 901 by the reference data In_Ref=410. Since the recording rate of light blue is 45%, the recording data of light blue is generated to determine that the ink is to be discharged to the pixels where the thresholds "1" to "1843" are set in the threshold matrix obtained after performing the inter-color process on the first threshold matrix 901. The threshold "1843" corresponds to a recording rate of 45 (=1843/4096×100) %. As described above, the threshold matrix after the inter-color process is obtained by offsetting the first threshold matrix 901 by the reference data In_Ref=410. Thus, as can be understood from [formula 2], the pixels where the thresholds "1" to "1843" are set in the threshold matrix after the inter-color process correspond to the pixels where the thresholds "411" (=1+410) to "2253" (=1843+410) are set in the first threshold matrix 901. That is, the recording data of light blue is generated to determine that the ink is to be discharged to the pixels where the thresholds "411" to "2253" are set in the first threshold matrix 901.

Then, yellow is quantized using the second threshold matrix 902 and without using the reference data In_Ref. Since the recording rate of yellow is 35%, the recording data of yellow is generated to determine that the ink is to be discharged to the pixels where the thresholds "1" to "1434" are set in the second threshold matrix 902. The threshold "1434" corresponds to a recording rate of 35 (=1434/4096×100) %. As described above, the second threshold matrix 902 is obtained by inverting the first threshold matrix 901. Thus, the pixels where the thresholds "1" to "1434" are set in the second threshold matrix 902 correspond to the pixels where the thresholds "2662" (=4096−1434) to "4095" (=4096−1) are set in the first threshold matrix 901. That is, the recording data of yellow is generated to determine that the ink is to be discharged to the pixels where the thresholds "2662" to "4095" are set in the first threshold matrix 901.

As can be understood from the above description and FIG. 10, according to the present exemplary embodiment, the pieces of recording data of the respective colors are generated such that light blue and yellow are not to be applied in a superimposed manner to the same pixel in the low gradation region of an image. Consequently, it is possible to reduce graininess occurring due to the fact that when the low gradation region of the black hue is recorded simultaneously using light blue and yellow, a gray dot is formed by superimposing the light blue ink and the yellow ink at the same pixel. A similar problem can also occur in a high lightness region of a chromatic color hue other than the black hue and obtained using large amounts of the light blue ink and the yellow ink. Also to cope with this, similar to the low gradation region of the black hue, it is possible to reduce graininess using threshold matrices based on which light blue and yellow are not to be applied in a superimposed manner to the same pixel. Color material data corresponding to a region having a lightness higher than a predetermined lightness may be quantized using threshold matrices in which thresholds are placed such that light blue and yellow are not to be applied in a superimposed manner. These threshold matrices correspond to, for example, threshold matrices in which thresholds are placed such that ink drops of light blue and yellow are not to be applied in a superimposed manner to an image having a high lightness that satisfies R>128, G>128, and B>128 in gradation data having 256 gradations for each of RGB.

In the present exemplary embodiment, the threshold matrix to be used for the light blue ink and the threshold matrix to be used for the yellow ink have an opposite (inverse) relationship with each other. The disclosure, however, is not limited to this. The disclosure is not limited to the above method so long as it is possible to suppress the superimposition of ink drops of a plurality of colors having a hue complementary to that of each other in the low gradation region where the lightness is high and graininess is conspicuous. For example, threshold matrices in which thresholds up to the halves of the thresholds in both threshold matrices have exclusive relationships are used, whereby it is possible to suppress the superimposition of ink drops in the low gradation region.

In the first exemplary embodiment, the form has been described in which a threshold matrix obtained by inverting the threshold matrix to be used for the processing target data of light blue is used for the processing target data of yellow.

In contrast to this, in a second exemplary embodiment, the form will be described in which the inter-color process is performed on the pieces of processing target data of yellow and light blue using the same threshold matrix.

Portions similar to those of the first exemplary embodiment are not described here.

(Combinations of Processing Target Data, Threshold Matrix, and Reference Data)

[Table 2] illustrates the combination of the threshold matrix to be used and the reference data to be selected for the processing target data of the ink of each color according to the present exemplary embodiment.

TABLE 2

| Processing target data In_Tag | Black | Cyan | Magenta | Light blue | Yellow |
|---|---|---|---|---|---|
| Threshold matrix | Third threshold matrix 903 | Third threshold matrix 903 | First threshold matrix 901 | First threshold matrix 901 | First threshold matrix 901 |
| Reference data In_Ref | Null | Black | Null | Magenta | Magenta Light blue |

As can be understood from [table 2], the pieces of processing target data In_Tag of black, cyan, magenta, and light blue are quantized based on combinations similar to those in the first exemplary embodiment illustrated in [table 1].

On the other hand, similar to the pieces of processing target data In_Tag of magenta and light blue, the processing target data In_Tag of yellow is quantized using the first threshold matrix 901. The processing target data In_Tag of yellow, however, is quantized using magenta and light blue as the reference data In_Ref.

(Quantization Results of Processing Target Data)

The quantization results obtained by performing the quantization involving the inter-color process according to the present exemplary embodiment will be described in detail below.

Figure 11:
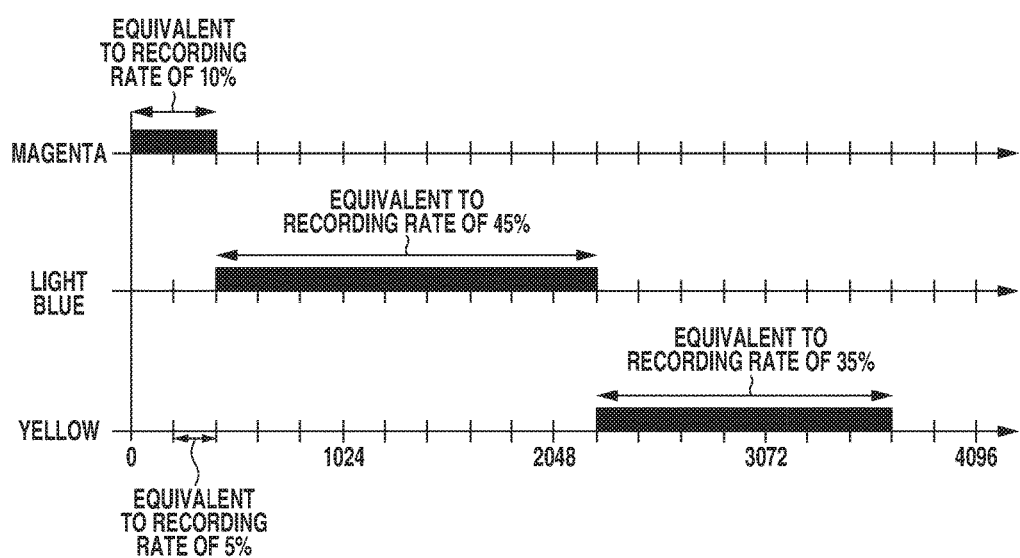
FIG. 11 is a diagram illustrating quantization results according to the exemplary embodiment.

FIG. 11 is a diagram illustrating pixels to which magenta, light blue, and yellow are to be discharged when the quantization involving the inter-color process according to the present exemplary embodiment is performed on the pieces of color material data of the respective colors corresponding to the first gradation in FIG. 6. In FIG. 11, scale marks and blacked-out regions are similar to those in FIG. 10.

As illustrated in FIG. 6, the recording rates of the inks of the respective colors in the first gradation of the black hue are about 0% for black, about 10% for cyan and magenta, about 35% for yellow, and about 45% for light blue. At this time, in the present exemplary embodiment, pixels to which the inks of magenta, light blue, and yellow are to be discharged are as illustrated in FIG. 11.

The quantization results of magenta and light blue are similar to those obtained by performing the quantization according to the first exemplary embodiment illustrated in FIG. 10, and therefore are not described here.

On the other hand, yellow is quantized using the first threshold matrix 901 and also using the data of magenta and light blue as the reference data In_Ref. As described in the first exemplary embodiment, the reference data In_Ref of magenta is 410. The reference data In_Ref of light blue is 1843 (=45×4096/100). Thus, the inter-color process is performed by offsetting the first threshold matrix 901 by 2253, which is the sum (ΣIn_Ref) of the reference data In_Ref=410 of magenta and the reference data In_Ref=1843 of light blue.

Since the recording rate of yellow is 35%, the recording data of yellow is generated to determine that the ink is to be discharged to the pixels where the thresholds "1" to "1434" are set in the threshold matrix after the inter-color process. The threshold "1434" corresponds to a recording rate of 35 (=1434/4096×100) %. As described above, the threshold matrix after the inter-color process is obtained by offsetting the first threshold matrix 901 by the reference data ΣIn_Ref=2253. Thus, as can be understood from [formula 2], the pixels where the thresholds "1" to "1434" are set in the threshold matrix after the inter-color process correspond to the pixels where the thresholds "2254" (=1+2253) to "3687" (=1434+2253) are set in the first threshold matrix 901. That is, the recording data of yellow is generated to determine that the ink is to be discharged to the pixels where the thresholds "2254" to "3687" are set in the first threshold matrix 901.

As can be understood from the above description and FIG. 11, also according to the present exemplary embodiment, the pieces of recording data of the respective colors can be generated such that light blue and yellow are not to be applied in a superimposed manner to the same pixel. Thus, it is possible to perform recording by reducing graininess when the low gradation region of the black hue is recorded.

(Comparison Between First and Second Exemplary Embodiments)

In both the first and second exemplary embodiments, as illustrated in each of FIGS. 10 and 11, graininess caused by light blue and yellow can be reduced in the first gradation of the black hue in FIG. 6.

It is, however, possible to perform more desirable recording in the first exemplary embodiment than in the second exemplary embodiment. This is described in detail below.

As described above, light blue and yellow are often simultaneously used to record the low gradation region of the black hue (a certain color is often reproduced using both light blue and yellow), and light blue and magenta are often simultaneously used to record a part of the blue hue closer to magenta. Regarding magenta and yellow, the inks of magenta and yellow are also often simultaneously used to reproduce a red hue, which is an intermediate hue between magenta and yellow. Thus, to reduce graininess caused by applying magenta and yellow in a superimposed manner to the same pixel, it is also desirable to apply magenta and yellow to exclusive pixels.

At this time, three cases are possible, i.e., a case where light blue and yellow are applied in a superimposed manner to the same pixel, a case where magenta and yellow are applied in a superimposed manner to the same pixel, and a case where magenta and light blue are applied in a superimposed manner to the same pixel. If these images are compared, graininess is least conspicuous in the image in which ink drops are formed in a superimposed manner in the combination of yellow and light blue. The lightness of magenta is significantly lower than the lightnesses of light blue and yellow. Thus, not only the visibility of a dot formed using magenta alone, but also the visibility of a dot of a secondary color formed by superimposing magenta with light blue or yellow is high. Thus, in a case where there is no choice but to apply dots of at least two colors of magenta, light blue, and yellow in a superimposed manner to the same pixel as in the high gradation region where the lightness is low, the combination of magenta and light blue and the combination of magenta and yellow are avoided as much as possible, and control is performed such that ink drops are to be applied in a superimposed manner in the combination of light blue and yellow, whereby it is possible to obtain an image in which graininess is less conspicuous.

Based on the above, the quantization results will be described in detail below which have been obtained by performing the quantization according to each of the first and second exemplary embodiments on the pieces of color material data of the respective colors corresponding to a second gradation (R, G, B=128, 128, 128) in FIG. 6. As illustrated in FIG. 6, the recording rates of the inks of the respective colors in the second gradation of the black hue are about 0% for black, about 20% for cyan and magenta, about 40% for yellow, and about 60% for light blue.

Figure 12:
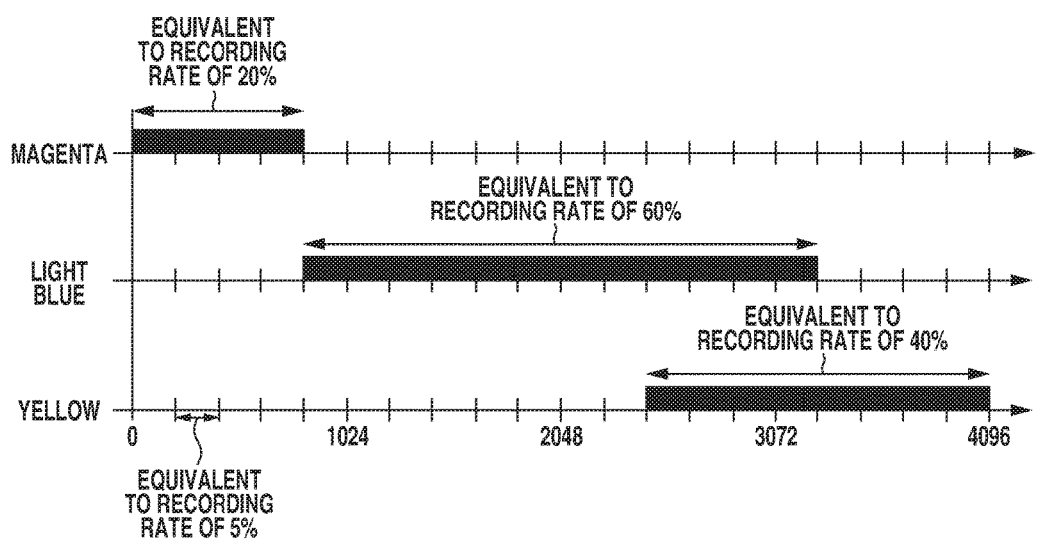
FIG. 12 is a diagram illustrating quantization results according to the exemplary embodiment.

FIG. 12 is a diagram illustrating pixels to which magenta, light blue, and yellow are to be discharged when the quantization involving the inter-color process according to the first exemplary embodiment is performed on the pieces of color material data of the respective colors corresponding to the second gradation in FIG. 6. In FIG. 12, scale marks and blacked-out regions are similar to those in FIG. 10.

First, magenta is quantized using the first threshold matrix 901 and without using the reference data In_Ref. Since the recording rate of magenta is 20%, the recording data of magenta is generated to determine that the ink is to be discharged to the pixels where the thresholds "1" to "819" are set in the first threshold matrix 901. The threshold "819" corresponds to a recording rate of 20 (=819/4096×100) %.

Next, light blue is quantized using the first threshold matrix 901 and also using the data of magenta as the reference data In_Ref. Thus, the inter-color process is performed by offsetting the first threshold matrix 901 by the reference data In_Ref=819. Since the recording rate of light blue is 60%, the recording data of light blue is generated to determine that the ink is to be discharged to the pixels where the thresholds "1" to "2458" are set in the threshold matrix obtained after performing the inter-color process on the first threshold matrix 901. The threshold "2458" corresponds to a recording rate of 60 (=2458/4096×100) %. As described above, the threshold matrix after the inter-color process is obtained by offsetting the first threshold matrix 901 by the reference data In_Ref=819. Thus, as can be understood from [formula 2], the pixels where the thresholds "1" to "2458" are set in the threshold matrix after the inter-color process correspond to the pixels where the thresholds "820" (=1+819) to "3277" (=2458+819) are set in the first threshold matrix 901. That is, the recording data of light blue is generated to determine that the ink is to be discharged to the pixels where the thresholds "820" to "3277" are set in the first threshold matrix 901.

Then, yellow is quantized using the second threshold matrix 902 and without using the reference data In_Ref. Since the recording rate of yellow is 40%, the recording data of yellow is generated to determine that the ink is to be discharged to the pixels where the thresholds "1" to "1638" are set in the second threshold matrix 902. The threshold "1638" corresponds to a recording rate of 40 (=1638/4096×100) %. As described above, the second threshold matrix 902 is obtained by inverting the first threshold matrix 901. Thus, the pixels where the thresholds "1" to "1638" are set in the second threshold matrix 902 correspond to the pixels where the thresholds "2458" (=4096-1638) to "4095" (=4096-1) are set in the first threshold matrix 901. That is, the recording data of yellow is generated to determine that the ink is to be discharged to the pixels where the thresholds "2458" to "4095" are set in the first threshold matrix 901.

As can be understood from the above description and FIG. 12, if the quantization process according to the first exemplary embodiment is performed, and when the second gradation of the black hue in FIG. 6 is recorded, parts of light blue and yellow are applied in a superimposed manner to the same pixel. However, magenta and light blue are applied to exclusive pixels. Similarly, yellow and magenta are also applied to exclusive pixels.

Figure 13:
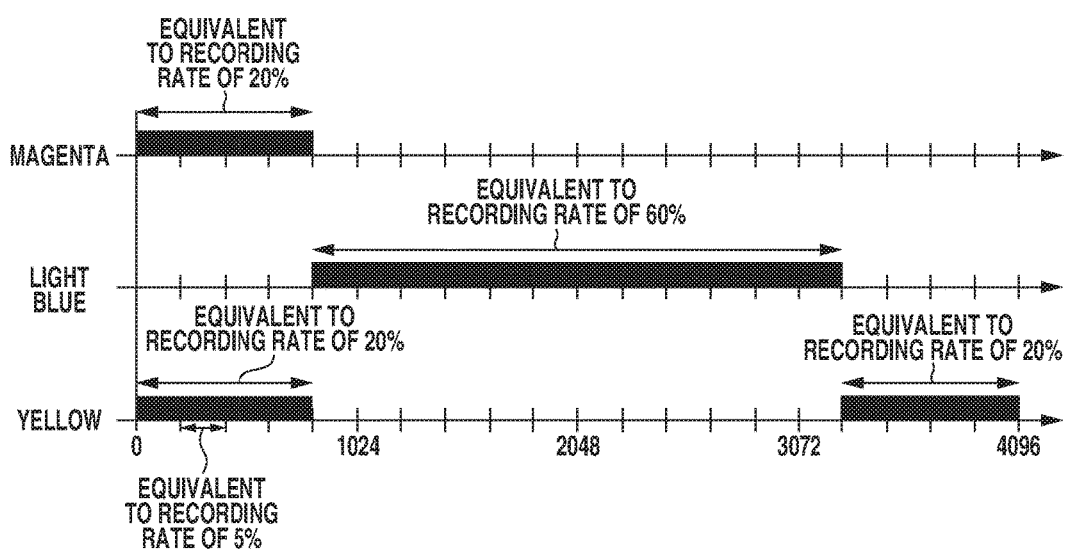
FIG. 13 is a diagram illustrating quantization results according to the exemplary embodiment.

On the other hand, FIG. 13 is a diagram illustrating pixels to which magenta, light blue, and yellow are to be discharged when the quantization involving the inter-color process according to the second exemplary embodiment is performed on the pieces of color material data of the respective colors corresponding to the second gradation in FIG. 6. In FIG. 13, scale marks and blacked-out regions are similar to those in FIG. 10.

The quantization results of magenta and light blue are similar to those obtained by performing the quantization according to the first exemplary embodiment illustrated in FIG. 12, and therefore are not described here.

On the other hand, yellow is quantized using the first threshold matrix 901 and also using the data of magenta and light blue as the reference data In_Ref. The reference data In_Ref of magenta is 819 (=20×4096/100), and the reference data In_Ref of light blue is 2458 (=60×4096/100). Thus, the inter-color process is performed by offsetting the first threshold matrix 901 by 3277, which is the sum (ΣIn_Ref) of the reference data In_Ref=819 of magenta and the reference data In_Ref=2458 of light blue.

Since the recording rate of yellow is 40%, the recording data of yellow is generated to determine that the ink is to be discharged to the pixels where the thresholds "1" to "1638" are set in the threshold matrix after the inter-color process. The threshold "1638" corresponds to a recording rate of 40 (=1638/4096×100) %.

As described above, the threshold matrix after the inter-color process is obtained by offsetting the first threshold matrix 901 by the reference data ΣIn_Ref=3277. Thus, as can be understood from [formula 2] and [formula 3], the pixels where the thresholds "1" to "1638" are set in the threshold matrix after the inter-color process correspond to the pixels where the thresholds "1" to "819" (1638+3277-4096) and "3278" (=1+3277) to "4096" are set in the first threshold matrix 901. That is, the recording data of yellow is generated to determine that the ink is to be discharged to the pixels where the thresholds "1" to "819" and "3278" to "4096" are set in the first threshold matrix 901.

As can be understood from the above description and FIG. 13, if the quantization process according to the second exemplary embodiment is performed, and when the second gradation of the black hue in FIG. 6 is recorded, parts of yellow and magenta are applied in a superimposed manner to the same pixel. However, light blue and yellow are applied to exclusive pixels. Similarly, light blue and magenta are also applied to exclusive pixels.

As described above, when the second gradation of the black hue is recorded, parts of yellow and magenta are applied in a superimposed manner to the same pixel in the second exemplary embodiment, whereas parts of light blue and yellow are applied in a superimposed manner to the same pixel in the first exemplary embodiment. As described above, it is more difficult to visually confirm graininess caused by applying light blue and yellow to the same pixel than to visually confirm graininess caused by applying yellow and magenta to the same pixel. Thus, it is possible to perform recording by suppressing a decrease in image quality more in the first exemplary embodiment.

In the first and second exemplary embodiments, the inter-color process is executed on the combination of black and cyan using the same threshold matrix, and the inter-color process is executed on the combination of magenta and light blue using the same threshold matrix.

In contrast, in a third exemplary embodiment, cyan and magenta are replaced by each other in the combinations in the first and second exemplary embodiments.

Portions similar to those of the first and second exemplary embodiments are not described here.

(Combinations of Processing Target Data, Threshold Matrix, and Reference Data)

[Table 3] illustrates the combination of the threshold matrix to be used and the reference data to be selected for the processing target data of the ink of each color according to the present exemplary embodiment.

TABLE 3

| Processing target data In_Tag | Black | Magenta | Cyan | Light blue | Yellow |
|---|---|---|---|---|---|
| Threshold matrix | Third threshold matrix 903 | Third threshold matrix 903 | First threshold matrix 901 | First threshold matrix 901 | Second threshold matrix 902 |
| Reference data In_Ref | Null | Black | Null | Cyan | Null |

As can be understood from [table 3], in the present exemplary embodiment, the pieces of processing target data In_Tag of black and magenta are quantized commonly using the third threshold matrix 903, black is quantized without using the reference data In_Ref, and magenta is quantized using the data of black as the reference data In_Ref. Thus, it is possible to record black with high dispersiveness. Further, although the dispersiveness of magenta is somewhat lower than that of black, it is possible to discharge the ink of magenta to pixels exclusive of pixels to which the ink of black is discharged.

The pieces of processing target data In_Tag of cyan and light blue are quantized commonly using the first threshold matrix 901, cyan is quantized without using the reference data In_Ref, and light blue is quantized using the data of cyan as the reference data In_Ref. Thus, it is possible to record cyan with high dispersiveness. Further, although the dispersiveness of light blue is somewhat lower than that of cyan, it is possible to discharge the ink of light blue to pixels exclusive of pixels to which the ink of cyan is discharged.

Further, the processing target data In_Tag of yellow is quantized using the second threshold matrix 902 and without using the reference data In_Ref. Thus, for example, when the first gradation of the black hue in FIG. 6 is recorded, it is possible to apply the yellow ink to pixels exclusive of pixels to which the inks of cyan and light blue are discharged. Further, when the second gradation of the black hue in FIG. 6 is recorded, it is understood that, similar to the description with reference to FIG. 12, inks are to be applied such that the inks of cyan and light blue are not superimposed, the inks of cyan and yellow are also not superimposed, and the inks of light blue and yellow are superimposed. Similar to magenta, the lightness of cyan is also low. Thus, graininess caused by applying cyan in a superimposed manner with the ink of another color is conspicuous. According to the present exemplary embodiment, in a case where there is no choice but to apply any two of cyan, yellow, and light blue in a superimposed manner, it is possible to superimpose yellow and light blue, which lead to the least conspicuous graininess. Thus, it is possible to suppress a decrease in image quality.

In the first and second exemplary embodiments, the form has been described in which the inter-color process is performed on the combination of magenta and light blue using the same threshold matrix, and a threshold matrix obtained by inverting the threshold matrix is used for yellow.

In contrast, in a fourth exemplary embodiment, light blue and yellow are replaced by each other in the first and second exemplary embodiments.

Portions similar to those of the first and second exemplary embodiments are not described here.

[Table 4] illustrates the combination of the threshold matrix to be used and the reference data to be selected for the processing target data of the ink of each color according to the present exemplary embodiment.

TABLE 4

| Processing target data In_Tag | Black | Cyan | Magenta | Yellow | Light blue |
|---|---|---|---|---|---|
| Threshold matrix | Third threshold matrix 903 | Third threshold matrix 903 | First threshold matrix 901 | First threshold matrix 901 | Second threshold matrix 902 |
| Reference data In_Ref | Null | Black | Null | Magenta | Null |

As can be understood from [table 4], in the present exemplary embodiment, the pieces of processing target data In_Tag of black, cyan, and magenta are subjected to the quantization process, similar to the first exemplary embodiment.

Meanwhile, the processing target data In_Tag of yellow is quantized using the first threshold matrix 901 commonly with magenta and also using the data of magenta as the reference data In_Ref. Thus, although the dispersiveness of yellow is lower than that of magenta, it is possible to discharge the ink of yellow to pixels exclusive of pixels to which the ink of magenta is discharged.

Further, the processing target data In_Tag of light blue is quantized using the second threshold matrix 902 and without using the reference data In_Ref. Thus, for example, when the first gradation of the black hue in FIG. 6 is recorded, it is possible to apply the light blue ink to pixels exclusive of pixels to which the inks of magenta and yellow are discharged. Further, when the second gradation of the black hue in FIG. 6 is recorded, similar to the description with reference to FIG. 12, inks are to be applied such that the inks of magenta and light blue are not superimposed, the inks of magenta and yellow are also not superimposed, the inks of light blue and yellow are superimposed. According to the present exemplary embodiment, similar to the first exemplary embodiment, in a case where there is no choice but to apply any two of magenta, yellow, and light blue in a superimposed manner, it is possible to superimpose yellow and light blue, which lead to the least conspicuous graininess. Thus, it is possible to suppress a decrease in image quality.

(Other Exemplary Embodiments)

In each of the exemplary embodiments, the form has been described in which a predetermined threshold matrix is used for processing target data of a certain color, and a threshold matrix obtained by inverting the predetermined threshold matrix is used for processing target data of another color. Alternatively, another form can also be carried out. Two threshold matrices do not need to have an inverse relationship with each other so long as the threshold matrices are somewhat different in the placement of thresholds. Specifically, for a pixel where a relatively low threshold is set in one threshold matrix, a relatively high threshold may be set in the other threshold matrix, and for a pixel where a relatively high threshold is set in one threshold matrix, a relatively low threshold may be set in the other threshold matrix. At this time, each relatively low threshold and each relatively high threshold may be determined by treating a threshold lower than half the maximum threshold in the threshold matrix as the relatively low threshold and treating a threshold higher than half the maximum threshold as the relatively high threshold.

Further, in each of the exemplary embodiments, the form has been described in which control is performed such that, for example, when the low gradation region of the black hue is recorded as illustrated in FIG. 10, the light blue ink and the yellow ink are to be applied to exclusive pixels. Alternatively, the form may be such that the light blue ink and the yellow ink are applied to somewhat different pixels, if not exclusive. In the form in which the light blue ink and the yellow ink are applied without overlapping each other at about 90% of pixels, it is possible to obtain effects similar to those of each of the exemplary embodiments.

Further, in each of the exemplary embodiments, the form has been described in which data generated as a result of performing the quantization process is treated as it is as the recording data. Alternatively, another form can also be carried out. For example, up to four values may be obtained by quantizing data in the quantization process, and then, binary data may be generated by performing an index development process and treated as the recording data. Here, the index expansion process is the process of converting multivalued data into binary data using an index pattern defining the number and the positions of pixels to which inks are to be discharged according to multivalued values in a certain region. Further, in a multipass recording method for performing recording by scanning a recording head multiple times in a predetermined region on a recording medium, a process for distributing binary data generated by the quantization process or the index expansion process to the multiple scans may be performed. This distribution process can be performed using a mask pattern obtained by placing pixels to which an ink is allowed to be discharged and not allowed to be discharged in a case where it is determined according to binary data that the ink is to be discharged.

In each of the exemplary embodiments, the form has been described in which a single CPU 301 and a single ROM 302 are included. Alternatively, a plurality of CPUs 301 and a plurality of ROMs 302 may be included. For example, in a case where a plurality of CPUs 301 are included, one of the CPUs 301 can also execute a part of the processing described in each of the exemplary embodiments, and another one of the CPUs 301 can also execute another part of the processing. Similarly, in a case where a plurality of ROMs 302 are included, one of the ROMs 302 can also store some of the programs and the threshold matrices used in each of the exemplary embodiments, and another one of the ROMs 302 can also store the other programs and threshold matrices.

Further, in each of the exemplary embodiments, the form has been described in which control is performed such that in a case where the light blue ink and the yellow ink are used, these inks are to be applied to exclusive pixels. Alternatively, another form can also be carried out. Not only the inks of light blue and yellow, but also inks of two colors which have a hue complementary to that of each other and at least one of which is a light color are often simultaneously used to record a low gradation region of an achromatic color. For example, also in a case where a light red ink and the cyan ink are used, or in a case where a light green ink and the magenta ink are used, these inks are often simultaneously used to record a low gradation region of an achromatic color. Thus, also in a case where the combination of these inks are used, the light blue ink and the yellow ink in each of the exemplary embodiments are replaced by these inks, whereby it is possible to obtain effects similar to those of each of the exemplary embodiments.

Further, in each of the exemplary embodiments, a recording apparatus and a recording method using the recording apparatus have been described. Alternatively, the disclosure can also be applied to an image processing apparatus or an image processing method for generating data for performing the recording method according to each of the exemplary embodiments. Further, the disclosure can also be applied to the form in which a program for performing the recording method according to each of the exemplary embodiments is prepared separately from the recording apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-153588, filed Aug. 8, 2017, which is hereby incorporated by reference herein in its entirety.

What is claimed is:

1. An image processing apparatus for, to record an image on a recording medium using a plurality of color materials including a first color material and a second color material which has a hue complementary to that of the first color material, processing image data corresponding to the image, the image processing apparatus comprising:
- a conversion unit configured to convert the image data into pieces of color material data corresponding to the plurality of color materials; and
- a generation unit configured to, based on the converted pieces of color material data, generate recording data to be used to record the plurality of color materials,
- wherein the conversion unit converts predetermined image data indicating a color that is an achromatic color and has a gradation less than or equal to an intermediate gradation in a gradation range for color reproduction, into the pieces of color material data such that a recording amount of the first color material and a recording amount of the second color material are larger than a recording amount of a color material different from the first and second color materials among the plurality of color materials, and
- wherein the generation unit generates the recording data such that a pixel where it is determined according to the recording data that the first color material is to be recorded and a pixel where it is determined according to the recording data that the second color material is to be recorded are at positions different from each other.

2. The image processing apparatus according to claim 1, wherein according to the recording data generated by the generation unit, the pixel where it is determined that the first color material is to be recorded and the pixel where it is determined that the second color material is to be recorded are at positions exclusive of each other.

3. The image processing apparatus according to claim 1,
- wherein based on the color material data corresponding to the first color material and a first threshold matrix in which a threshold for determining whether a color material is to be recorded or not to be recorded is set for each pixel, the generation unit generates recording data corresponding to the first color material, and
- wherein based on the color material data corresponding to the second color material and a second threshold matrix in which a threshold for determining whether a color material is to be recorded or not to be recorded is set for each pixel, the generation unit generates recording data corresponding to the second color material.

4. The image processing apparatus according to claim 3, wherein sums of the thresholds set in the first threshold matrix and the thresholds set in the second threshold matrix that correspond to all the pixels are the same value.

5. The image processing apparatus according to claim 3,
- wherein the plurality of color materials include a third color material, and a lightness of the third color material is lower than a lightness of the first color material and also lower than a lightness of the second color material,
- wherein based only on the color material data corresponding to the third color material and the first threshold matrix, the generation unit generates recording data corresponding to the third color material, and
- wherein based on the color material data corresponding to the first color material, the first threshold matrix, and the color material data corresponding to the third color material, the generation unit generates recording data corresponding to the first color material.

6. The image processing apparatus according to claim 5, wherein with respect to each pixel, the generation unit offsets the threshold in the first threshold matrix by a value indicated by the color material data corresponding to the third color material, and based on the color material data corresponding to the first color material and the first threshold matrix after the offset, the generation unit generates recording data corresponding to the first color material.

7. The image processing apparatus according to claim 5,
- wherein the plurality of color materials include a fourth color material and a fifth color material,
- wherein a lightness of the fourth color material is lower than the lightness of the first color material and also lower than the lightness of the second color material,
- wherein a lightness of the fifth color material is lower than all of the lightness of the first color material, the lightness of the second color material, the lightness of the third color material, and the lightness of the fourth color material, and
- wherein based only on the color material data corresponding to the fifth color material and a third threshold matrix in which a threshold for determining whether a color material is to be recorded or not to be recorded is set for each pixel, the generation unit generates recording data corresponding to the fifth color material, and based on the color material data corresponding to the fourth color material, the third threshold matrix, and the color material data corresponding to the fifth color material, the generation unit generates recording data corresponding to the fourth color material.

8. The image processing apparatus according to claim 7, wherein with respect to each pixel, the generation unit offsets the threshold in the third threshold matrix by a value indicated by the color material data corresponding to the fifth color material, and based on the color material data corresponding to the fourth color material and the third threshold matrix after the offset, the generation unit generates recording data corresponding to the fourth color material.

9. The image processing apparatus according to claim 7, wherein in the first threshold matrix and the third threshold matrix, the threshold is set for each pixel such that a pixel where a threshold having a value smaller than a predetermined value is set in the first threshold matrix and a pixel where a threshold having a value smaller than the predetermined value is set in the third threshold matrix are at positions different from each other.

10. The image processing apparatus according to claim 7, wherein each of the first threshold matrix and the third threshold matrix has blue noise characteristics.

11. The image processing apparatus according to claim 7, wherein one of a color of the first color material and a color of the second color material is yellow, the other of the colors is light blue, a color of the fifth color material is black, one of a color of the third color material and a color of the fourth color material is cyan, and the other of the colors is magenta.

12. The image processing apparatus according to claim 1, wherein the plurality of color materials are contained in inks of a plurality of colors corresponding to the plurality of color materials.

13. The image processing apparatus according to claim 12, further comprising a recording head configured to discharge the inks of the plurality of colors.

14. The image processing apparatus according to claim 1, wherein the conversion unit converts image data indicating a color that is a chromatic color and has a gradation less than or equal to an intermediate gradation in a gradation range for color reproduction, into the pieces of color material data such that a recording amount of the first color material and a recording amount of the second color material are larger than a recording amount of a color material different from the first and second color materials among the plurality of color materials.

15. An image processing apparatus for, to record an image on a recording medium using a plurality of color materials including a first color material and a second color material which has a hue complementary to that of the first color material, processing image data corresponding to the image, the image processing apparatus comprising:
  a conversion unit configured to convert the image data into pieces of color material data corresponding to the plurality of color materials; and
  a generation unit configured to, based on the converted pieces of color material data and using a threshold matrix in which a threshold for determining whether a color material is to be recorded or not to be recorded is set for each pixel, generate recording data to be used to record the plurality of color materials,
  wherein the conversion unit converts predetermined image data indicating a color that is an achromatic color and has a gradation less than or equal to an intermediate gradation in a gradation range for color reproduction, into the pieces of color material data such that a recording amount of the first color material and a recording amount of the second color material are larger than a recording amount of a color material different from the first and second color materials among the plurality of color materials,
  wherein based on the color material data corresponding to the first color material and a first threshold matrix in which a threshold for determining whether a color material is to be recorded or not to be recorded is set for each pixel, the generation unit generates recording data corresponding to the first color material,
  wherein based on the color material data corresponding to the second color material and a second threshold matrix in which a threshold for determining whether a color material is to be recorded or not to be recorded is set for each pixel, the generation unit generates recording data corresponding to the second color material, and
  wherein sums of the thresholds set in the first threshold matrix and the thresholds set in the second threshold matrix that correspond to all the pixels are the same value.

16. The image processing apparatus according to claim 15, wherein one of a color of the first color material and a color of the second color material is yellow, the other of the colors is light blue, and a color of the third color material is either of cyan and magenta.

17. The image processing apparatus according to claim 15,
  wherein the plurality of color materials include a third color material, and a lightness of the third color material is lower than a lightness of the first color material and also lower than a lightness of the second color material,
  wherein based only on the color material data corresponding to the third color material and the first threshold matrix, the generation unit generates recording data corresponding to the third color material, and
  wherein based on the color material data corresponding to the first color material, the first threshold matrix, and the color material data corresponding to the third color material, the generation unit generates recording data corresponding to the first color material.

18. The image processing apparatus according to claim 17, wherein with respect to each pixel, the generation unit offsets the threshold in the first threshold matrix by a value indicated by the color material data corresponding to the third color material, and based on the color material data corresponding to the first color material and the first threshold matrix after the offset, the generation unit generates recording data corresponding to the first color material.

19. An image processing apparatus for, to record an image on a recording medium using a plurality of inks including a yellow ink and a light blue ink, processing image data corresponding to the image, the image processing apparatus comprising:
  an acquisition unit configured to acquire the image data;
  a conversion unit configured to convert the image data into pieces of ink data corresponding to the plurality of inks; and
  a generation unit configured to, based on the pieces of ink data, generate recording data to be used to record the plurality of inks,
  wherein the generation unit generates the recording data such that, in a low gradation region of a black hue, a pixel where it is determined according to the recording data that the yellow ink is to be recorded and a pixel where it is determined according to the recording data that the light blue ink is to be recorded are at positions different from each other.

20. An image processing method for, to record an image on a recording medium using a plurality of color materials including a first color material and a second color material which has a hue complementary to that of the first color material, processing image data corresponding to the image, the image processing method comprising:
  converting the image data into pieces of color material data corresponding to the plurality of color materials; and
  based on the converted pieces of color material data, generating recording data to be used to record the plurality of color materials,
  wherein predetermined image data indicating a color that is an achromatic color and has a gradation less than or equal to an intermediate gradation in a gradation range for color reproduction is converted into the pieces of color material data such that a recording amount of the first color material and a recording amount of the second color material are larger than a recording amount of a color material different from the first and second color materials among the plurality of color materials, and
  wherein the recording data is generated such that a pixel where it is determined according to the recording data that the first color material is to be recorded and a pixel where it is determined according to the recording data that the second color material is to be recorded are at positions different from each other.

* * * * *